United States Patent
Potlapally et al.

(10) Patent No.: US 9,836,354 B1
(45) Date of Patent: Dec. 5, 2017

(54) AUTOMATED ERROR DETECTION AND RECOVERY FOR GPU COMPUTATIONS IN A SERVICE ENVIRONMENT

(71) Applicant: Amazon Technologies, Inc., Reno, NV (US)

(72) Inventors: Nachiketh Rao Potlapally, Arlington, VA (US); John Merrill Phillips, Seattle, WA (US); Nicholas Patrick Wilt, Mercer Island, WA (US); Deepak Singh, Issaquah, WA (US); Scott Michael Le Grand, Soquel, CA (US)

(73) Assignee: Amazon Technologies, Inc., Reno, NV (US)

( * ) Notice: Subject to any disclaimer, the term of this patent is extended or adjusted under 35 U.S.C. 154(b) by 179 days.

(21) Appl. No.: 14/263,701

(22) Filed: Apr. 28, 2014

(51) Int. Cl.
  *G06F 11/00* (2006.01)
  *G06F 11/14* (2006.01)

(52) U.S. Cl.
  CPC ................ *G06F 11/1438* (2013.01)

(58) Field of Classification Search
  USPC .......................................... 714/16
  See application file for complete search history.

(56) References Cited

U.S. PATENT DOCUMENTS

| | | | |
|---|---|---|---|
| 2004/0025076 A1* | 2/2004 | Cabrera | G06F 11/1471 714/2 |
| 2007/0245174 A1* | 10/2007 | Gale | G06F 11/0748 714/57 |
| 2010/0017661 A1* | 1/2010 | Queck | H04L 12/40006 714/43 |
| 2011/0078427 A1 | 3/2011 | Shebanow et al. | |
| 2011/0084978 A1 | 4/2011 | Schuette | |
| 2012/0066668 A1 | 3/2012 | Buck et al. | |
| 2013/0117631 A1 | 5/2013 | Gruner et al. | |
| 2013/0226535 A1 | 8/2013 | Tuan | |
| 2014/0181587 A1* | 6/2014 | Sridharan | G06F 11/1482 714/37 |
| 2014/0267328 A1* | 9/2014 | Banack | G06T 1/20 345/522 |

* cited by examiner

*Primary Examiner* — Sarai Butler
(74) *Attorney, Agent, or Firm* — Robert C. Kowert; Meyertons, Hood, Kivlin, Kowert & Goetzel, P.C.

(57) ABSTRACT

A service provider system may implement ECC-like features when executing computations on GPUs that do not include sufficient error detection and recovery for computations that are sensitive to bit errors. During execution of critical computations on behalf of customers, the system may automatically instrument program instructions received from the customers to cause each computation to be executed using multiple sets of hardware resources (e.g., different host machines, processor cores, or internal hardware resources). The service may provide APIs with which customers may instrument their code for execution using redundant resource instances, or specify parameters for applying the ECC-like features. The service or customer may instrument code to perform (or cause the system to perform) checkpointing operations at particular points in the code, and to compare intermediate results produced by different hardware resources. If the intermediate results do not match, the computation may be restarted from a checkpointed state.

20 Claims, 11 Drawing Sheets

AUTOMATED ERROR DETECTION AND RECOVERY FOR GPU COMPUTATIONS IN A SERVICE ENVIRONMENT

BACKGROUND

Customers of cloud computing services run a variety of high performing computing (HPC) applications on service provider resources, including Computer Aided Engineering (CAE) and Computer Aided Design (CAD) tools; molecular modeling, genome analysis, and other types of scientific modeling; numerical modeling for financial and manufacturing applications, or other applications used to perform research in physics, chemistry, biology, computer science, or materials science. In some cases, these customers use graphics processing units (GPUs) for high performance computing tasks in order to take advantage of the parallelism inherent in such processors. In fact, there exist several large ecosystems for using GPUs for high performance computing (e.g., from GPU vendors and computing platform vendors) that essentially turn GPUs into single chip super computers. For example, each GPU can be equivalent to multiple current-technology 16-core workstations.

Some high performance computing applications (e.g., financial and scientific modeling and simulation applications) are especially sensitive to bit errors, which can throw off their models significantly. In other words, correctness of computation is a critical requirement for some customer applications. However, many GPUs do not include hardware support for error checking and correction, or do not implement sufficient error detection and recovery for these types of applications.

Figure 1:
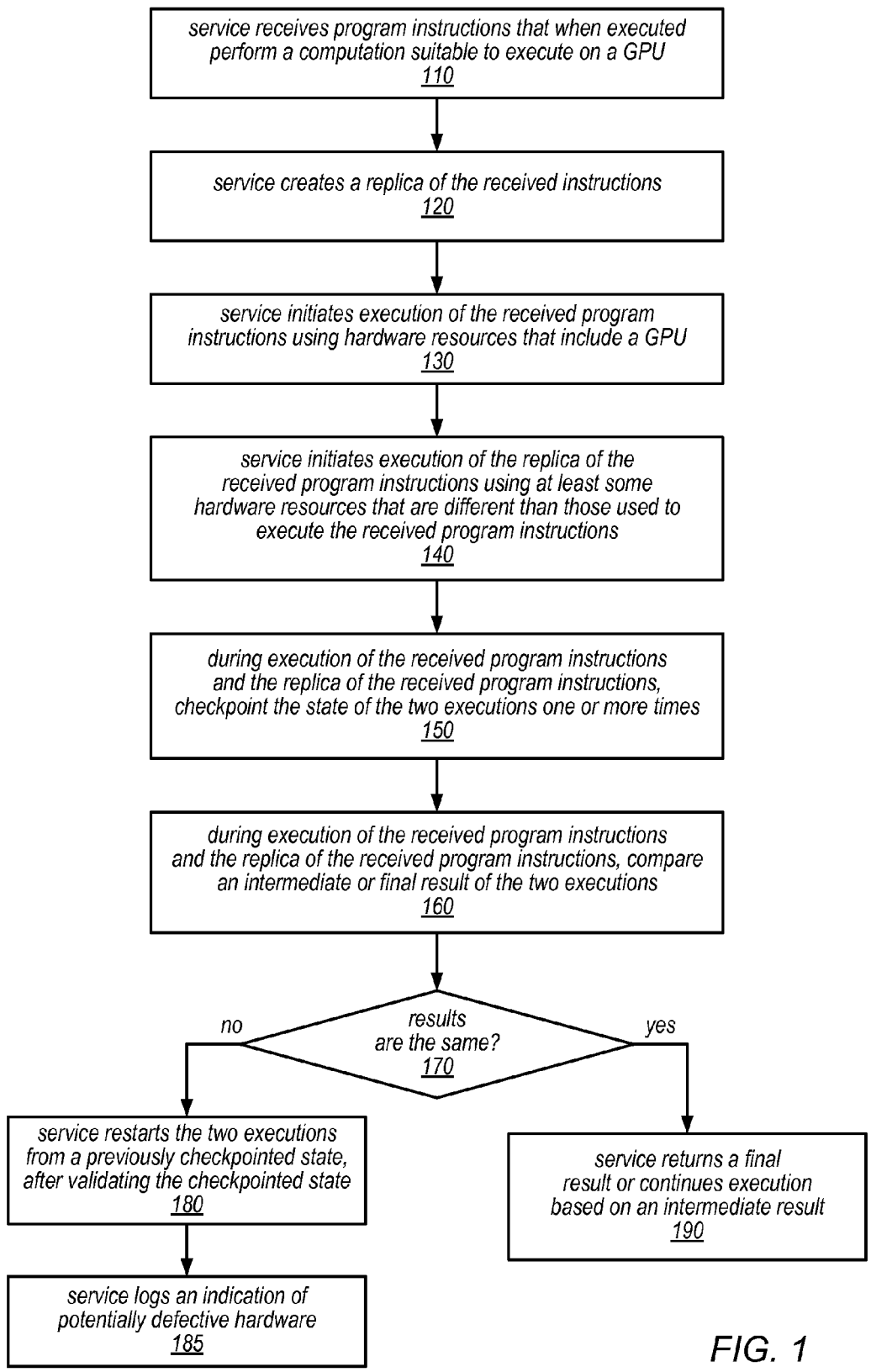
FIG. 1 is a flow diagram illustrating one embodiment of a method for performing automated error detection and recovery for GPU computations.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

As noted above, some high performance computing applications are especially sensitive to bit errors, which can throw off their models significantly. However, many GPUs do not include hardware support for error checking and correction (ECC support), or do not implement sufficient error detection and recovery for these types of applications. In some cases, ECC features may not be included (or enabled) at all, or ECC features that are included in the GPUs may not cover all operations. For example, they may not provide error detection and recovery for operations involving cache accesses, but only for accesses to external memory (e.g., system memory).

The systems and methods described herein may be used to detect and recover from errors in computations performed by graphics processing units (GPUs). While the techniques described herein may be primarily used to detect and recover from errors in computations that are caused by manufacturing defects, they may also be used to detect and recover from soft errors and/or other types of errors that are caused by environmental factors, e.g., cosmic rays, alpha particle emissions, thermal neutrons, random noise, signal integrity, or other anomalies in the physical environment in which they are executing. In general, the techniques described herein may allow computations to be resilient in the face of these and/or many other different types of errors. In some embodiments, the techniques described herein for providing ECC-like features (e.g., when a GPU on which computations are executed does not include sufficient error detection and recovery mechanisms) may be implemented by a service provider, and the application of these ECC-like features may be offered by the service provider when providing computational services to service subscribers. For example, a request for computational services may include an indication of whether a computation that is to be executed on a GPU by the service provider should be executed in an "ECC-like mode", and may also include an indication of an assurance level that is desired for the computation. In some embodiments, the assurance level may imply or suggest a particular granularity with which the ECC-like features offered by the service should be applied.

In some embodiments, a service provider that provides computational services to customers (e.g., service subscribers) may provide error checking and recovery for computations performed on GPUs (e.g., those that do not include built-in hardware support for error checking and correction or that do not provide error checking and correction for caches) by running all or portions of the computations on multiple sets of hardware resources (e.g., roughly in parallel on different GPUs or hosts, or serially by instruction on different resources within the same GPU) and then comparing the results. In the case that an error is detected, the computation may be rolled back to a previously saved checkpoint (e.g., a checkpoint prior to the last successful compare operation) and execution may resume from that point forward on the same or different hardware resources of the service provider. In other words, execution of the computation may not need to be restarted all the way back at the beginning when an error is detected. In some embodiments, the granularity with which the ECC-like features offered by the service are applied may be manifested in the frequency at which checkpointing and/or comparison operations are performed or the number of redundant computing resource instances on which the computation is performed. In some embodiments, customers (subscribers) may have the option to pay more to receive a higher level of assurance for especially critical computations. In such embodiments, the service provider may scale these ECC-like features up, such that a larger number of redundant computations are performed for those critical computations.

In some embodiments, the target application code (e.g., a client application containing a computation to be executed using a GPU) may be instrumented using static compiler-based techniques or dynamic translation to introduce software-based error checking and recovery routines. For example, in one embodiment, the following code modifications are performed:
1. Each instruction in the original program is duplicated to create a replicated instruction stream that is to be run on hardware resources other than those on which the original program will be run. Note that the replicated instruction stream may or may not include an exact copy of the original program (e.g., one that includes the same source-level or machine-level instructions), but may be configured to perform the same functions as the original program (e.g., using the same data, and in the same order as in the original program).
2. Verification instructions are added that compare the computation results of variables in the application code and the results of the corresponding variables in the replicated instruction stream, e.g., at regular (or at least the same) intervals. In the absence of any errors, these values should always be the same.
3. Checkpointing instructions are added that save the original program state at regular (or at least the same) intervals. The state saved should be sufficient to restart the GPU computation deterministically from the point at which the checkpoint was performed (e.g., the last checkpoint at which the results of the two computations are known to match).

In this example, during execution of the computation, the verification instructions compare the results in the original and replicated program. In case that there is a divergence between them, the state of the GPU is rolled back to the checkpointed state before the last successful verification point, and the computation is restarted at that point. In some embodiments, this approach to providing ECC-like features for GPU computations may be especially efficient for long-running customer computations that are being performed by a service provider on behalf of the customer for which an error in GPU computations might otherwise require restarting the entire computation. In some embodiments, this approach to providing ECC-like features for GPU computations may be more cost effective for the customers/subscribers and/or for the service provider than running the computation on ECC-enabled resources (e.g., on GPUs that include built-in hardware support for error checking and correction). For example, in some embodiments of the systems described herein, executing a computation on two non-ECC-enabled computing resource instances may be cheaper than executing the same computation on a single ECC-enabled computing resource instance.

Note that, in some embodiments, prior to restoring a checkpointed state, steps may be taken to ensure that the checkpoint itself (e.g., the stored data representing the checkpointed state) has not been tampered with or otherwise corrupted. In some embodiments, some or all of the checkpoints taken during execution of the GPU computation on multiple sets of resources may be encrypted or otherwise secured to prevent corruption of the checkpointed data by others. For example, in some embodiments, each checkpoint that is taken during execution of received program instructions and/or during execution of a replica of the received program instructions may be secured or otherwise protected from corruption using cryptographic hashing or using other mechanisms. In some embodiments, each checkpoint (and/or a log of all checkpoints) may be encrypted using one or more service provider keys and/or subscriber keys, or may be associated with digital certificates that are provided to and/or examined by the restore operation (or another process) to determine their validity prior to restarting the execution of the GPU computation from a checkpointed state. For example, in some embodiments, the service may be configured to create a log that identifies all checkpoints taken during execution of the GPU computation on each set of resources (e.g., one log for each redundant computation) and, each time an entry is created in the log(s), to generate a signature for the log(s) using a private key. In various embodiments, such encrypted hash values, digital signatures, or digital certificates may be provided to the service for use in diagnosing defective hardware and/or may be provided (or made available) to a restore operation, which may first determine the validity of a target checkpoint (e.g., by comparing the previously generated encrypted hash values, digital signatures, or certificates to others generated from the stored checkpoints) before restarting the GPU computation using the checkpointed state.

One embodiment of a method for performing automated error detection and recovery for GPU computations is illustrated by the flow diagram in FIG. 1. As illustrated at 110, in this example, the method may include a service receiving program instructions that when executed perform a computation suitable for execution on a GPU. For example, the computation may be well suited to take advantage of the parallelism offered by execution on a GPU, and the program instructions for performing the computation may be written in such a way as to facilitate its execution on a GPU (e.g., using instructions of the GPU instruction set). In some embodiments, the received program instructions may include only the code necessary to perform the target computation, while in others the code necessary to perform the target computation may be included in a larger collection of program instructions that perform the target computation and other tasks. As illustrated in this example, the method may also include the service creating a replica of the received program instructions, as in 120. For example, the service may create a replica of at least the subset of the received program instructions that perform the computation. In various embodiments, creating the replica may or may not include modifying the code that actually performs the computation. For example, in some embodiments, creating the replica may include modifying enclosing code to direct the execution of the code that performs the computation to a different GPU or to change an address mapping that is used by the code that performs the computation without changing the instructions that perform the computation. In other words, in various embodiments, the replicas described in this and other examples may or may not include exact copies of the code that performs the computations in the received program instructions (e.g., one that includes the same source-level or machine-level instructions), but may be configured to perform the same functions as the received program instructions (e.g., using the same data, and in the same order as in the received program instructions) using modified code.

As illustrated in this example, the method may include the service initiating execution of the received program instructions using hardware resources that include a GPU, as in 130. The method may also include the service initiating execution of the replica of the received program instructions using at least some hardware resources that are different from the resources that are used to execute the received program instructions, as in 140. The method may also include, during execution of the received program instructions and the replica of the received program instructions, checkpointing the state of the two executions one or more times, as in 150. For example, in some embodiments, this checkpointing may be performed by code that was added to the received program instructions and to the replica of the received program instructions by the service (e.g., when instrumenting the program instructions to implement the ECC-like features described herein). As described in more detail below, multiple such checkpoints may be taken at various points during the execution (e.g., after each instruction, after the execution of each basic block, following the execution of each function or sub-function, or at other significant points in the computation).

As illustrated in this example, the method may include, during execution of the received program instructions and the replica of the received program instructions, comparing an intermediate or final result of the two executions, as in 160. For example, in some embodiments, this comparison operation may be performed by code that was added to the received program instructions and/or to the replica of the received program instructions by the service (e.g., when instrumenting the program instructions to implement the ECC-like features described herein). In other embodiments, a separate process executing at the service provider (e.g., an error detection and recovery process that is invoked by the service provider and configured to perform at least a portion of the checkpointing and/or comparison operations described herein) may be configured to access intermediate and/or final results of the executions and to perform the comparisons. For example, intermediate and/or final results may be included in checkpointed state information or in shared memory locations in which they are stored by the computations, either of which may be accessible to a process that performs some of the functionally of the ECC-like features described herein. Intermediate results may include state information for the computations or the resources on which they are executing, results of various function or method calls, values of variables used in the computation, or any other information produced by the execution of the received program instructions and execution of the replica of the received program instructions. As described in more detail below, multiple such comparisons may be made at various points during the execution, according to different embodiments (e.g., after each instruction, after the execution of each basic block, following the execution of each function or sub-function, prior to or after each checkpointing operation, or at other significant points in the computation).

As illustrated in this example, if the results are not the same (shown as the negative exit from 170), the method may include restarting the two executions from a previously checkpointed state, after first validating the checkpoint data associated with the checkpointed state (as in 180). For example, in various embodiments, the method may include comparing an encrypted hash value, digital signature, or certificate generated for the checkpoint to a previously stored hash value, digital signature, or certificate for the checkpoint to determine whether the checkpoint data is still valid. In such embodiments, the method may include restarting the executions from the most recent checkpointed state prior to the point of the last successful comparison operation (i.e., a comparison in which the results of the two executions matched) or from any other checkpointed state prior to the point of the last successful comparison operation only if the target checkpoint is determined to be valid. Note that in some embodiments, the method may include restarting the executions on the same two sets of resources as those on which the comparison operation failure was detected one or more times. In such embodiments, if the same comparison fails again (or if another comparison of the same or different intermediate or final results fails on these sets of resources), the method may include restarting the executions on two different sets of resources and continuing the executions from that point forward using these two different sets of resources. In other embodiments, the method may include restarting the executions on two different sets of resources in response to any comparison operation failure. As illustrated in this example, in some embodiments, in response to determining that the results are not the same, the method may also include the service generating (e.g., logging or returning) an indication of potentially defective hardware, as in 185. In other embodiments, the service may generate an indication of potentially defective hardware instead of (rather than in addition to) initiating a recovery operation (as in 180). In other words, in some embodiments, the techniques described herein for performing automated error detection for GPU computations may be used to diagnose defective hardware in the system instead of (or in addition to) providing recovery operations for such computations when and if an error is detected.

As illustrated in this example, if the results that were compared are the same (or once they are the same following a restart of the computation from a previous checkpoint), the method may include returning the final result or continuing the two executions based on the validated intermediate result. This is shown as the path from the positive exit of 170 to 190. For example, after each one of multiple checkpoint and comparison points that are to be performed during execution of the computation, the method may include continuing to execute until reaching the next checkpoint and comparison points and repeating the operations illustrated at 150-190, as applicable, until validating the final result of the computation (not shown). Note that in various embodiments, returning the final result of the computation after executing it with the same results on two different sets of resources may (in some embodiments, or optionally) include returning an indication of the level of assurance that the result of the computation is correct.

Note that while this and other examples described herein illustrate embodiments in which a checkpoint is taken prior to performing a corresponding compare operation, in other embodiments, comparison operations may be performed prior to taking the corresponding checkpoint operations. For example, in some embodiments, the state of the computation and the resources on which it is executing may be checkpointed only in response to performing a successful comparison operation (i.e., a comparison operation in which result values for multiple redundant executions of the computation match). This approach may avoid taking a checkpoint only to soon discover that the computations have already diverged, in which case the computation may be restarted at a point prior to the most recent checkpoint (e.g., at the checkpoint prior to the last successful comparison operation), and the most recent checkpoint may be overwritten or otherwise discarded. Note also that the techniques described herein to provide ECC-like features as a service when executing GPU computations on behalf of customers may be applicable only to computations that are deterministic (e.g., those that are repeatable with same results).

In some embodiments, in providing ECC-like features for service subscribers, the systems described herein may be configured to run each (entire) computation twice, on two different hosts. For example, the same computation may be executed on two distinct host machines that include the same hardware and software. Because it is unlikely that the two distinct host machines exhibit the same manufacturing defect in corresponding ones of their components, this coarse approach may, in some embodiments, provide better error-detecting coverage than the execution of computations using ECC-enabled hardware resources.

In some embodiments, a finer grained approach may be employed in providing ECC-like features for service subscribers. For example, in some embodiments, in addition to running customer application code that performs a computation on a GPU, a copy of the code may be instrumented so that it runs on a CPU on the same host machine or on a second GPU on the same host machine. An even finer grained approach may include instrumenting the code so that each instruction is executed using different lower level hardware resources of the same GPU (e.g., using different registers, ALUs, or other functional units within the GPU to perform the same operation twice), after which the result of the instruction may be validated by comparing the two results generated for the instruction. In other words, in some embodiments, each instruction in the original program may be duplicated to create a replicated instruction stream, and the original and replicated instruction streams may run on different hardware resources in the GPU, or between the GPU and a CPU, to maximize the probability of error detection. For example, memory operations may be replicated with memory operations targeting different memory addresses such that the replicated instructions access different DRAM cells than the original instructions, and arithmetic/logical instructions may be replicated such that the replicated instructions use different sets of hardware registers than the original instructions. In some embodiments, the compiler may cause the execution of a replicated instruction stream to be scheduled on a different processing core within the GPU than the processing core within the GPU (e.g., the same GPU) on which it schedules the original application (with or without modifying the individual instructions of the replicated instruction stream).

As with the coarse grained approach described above, each of these fine grained approaches may involve executing the computation on different sets of hardware resources, the results of which may be validated (using comparison operations), and performing checkpointing operations (to save the state of the computations and the resources on which they are executing in case a defect is detected and the computation is to be restarted). In general, the redundant computations described herein may implement the functionality of an originally received computation using a fined-grained replica of the originally received computation or a coarse-grained replica of the originally received computation, in different embodiments.

Figure 2:
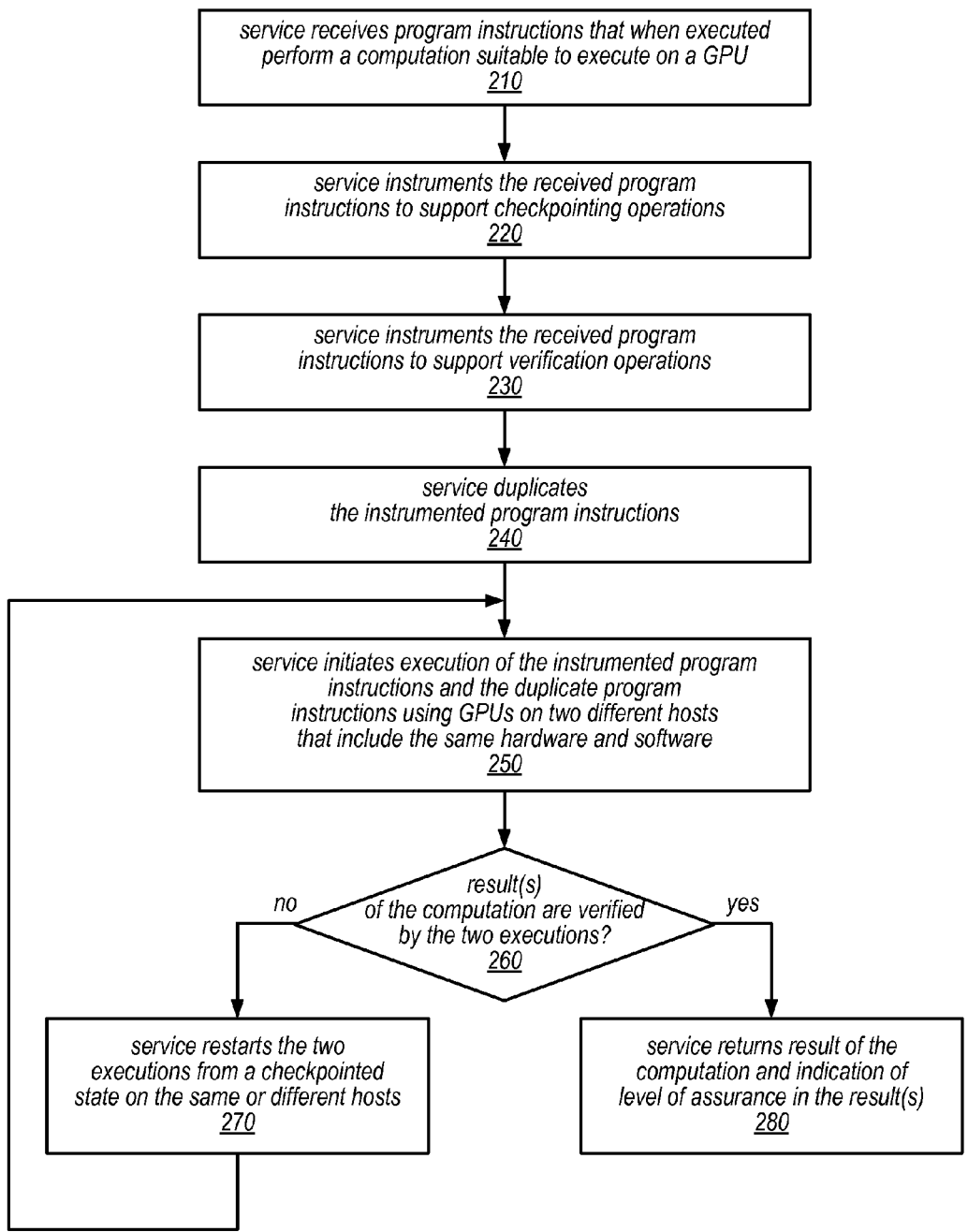
FIG. 2 is a flow diagram illustrating one embodiment of a method for implementing an ECC-like feature when executing a replicated instruction stream on two different hosts.

One embodiment of a method for implementing an ECC-like feature when executing a replicated instruction stream on two different hosts is illustrated by the flow diagram in FIG. 2. As illustrated at 210, in this example, the method may include a service receiving program instructions that when executed perform a computation that is suitable for execution on a GPU. For example, in some embodiments, the program instructions for the computation may be written in such a way as to facilitate their execution on a GPU (e.g., using instructions of the GPU instruction set). The method may include the service (e.g., using an instrumentation process that is configured to receive program instructions and modify them for execution using ECC-like techniques) instrumenting the received program instructions to support checkpointing operations, as in 220. For example, in different embodiments, the service may be configured to instrument the computation code to include instructions (or calls to a library of functions that support ECC-like features) to perform checkpointing operations at various points in the code. The method may also include the service (e.g., using the instrumentation process) instrumenting the received program instructions to support verification operations, as in 230. For example, in different embodiments, the service may be configured to instrument the computation code to include instructions (or calls to a library of functions that support ECC-like features) to perform comparison operations at various points in the code (e.g., immediately, or shortly, before or after a corresponding checkpointing operation).

As illustrated in this example, the method may also include the service duplicating the instrumented program instructions, as in 240. For example, in some embodiments, the service may not change the instrumented code that performs the computation itself, but may modify the enclosing code, if necessary, to cause a copy of the instrumented code that performs the computation to run on a different host. The method may include the service initiating execution of the instrumented program instructions and the duplicate program instructions using GPUs on two different hosts that include the same hardware and software, as in 250. For example, the service may be configured to schedule execution of the instrumented program instructions and the duplicate program instructions on multiple distinct host machines for execution using GPUs that do not include built-in hardware support for ECC or on which an ECC feature is not enabled or is not sufficient for detecting and recovering from manufacturing errors or other issues when executing computations for which correctness is critical.

If the result(s) of the computation are verified by the two executions (shown as the positive exit from 260), the method may include the service returning the result of the computation and (in some embodiments, or optionally) may also return an indication of the level of assurance in the result(s), as in 280. On the other hand, if the result(s) of the computation are not verified by the two executions (shown as the negative exit from 260), the method may include the service restarting the two executions from a previously checkpointed state (e.g., a known correct and/or verified correct state) on the same hosts or on different hosts, as in 270. As described above, this restore operation may include verifying that stored data representing the previously checkpointed state has not been tampered with or otherwise corrupted before restoring the two executions (not shown). As illustrated in this example, the operations at 250-270 may be repeated (shown as the feedback from 270 to 250) until the results have been verified or until a retry limit or timeout condition is met (not shown).

As described herein, in some embodiments, a service provider may instrument the program instructions for a computation after receiving them from a customer (e.g., a service subscriber). The service provider may (e.g., through an instrumentation process or another a program that is configured to automatically manage the execution of computations on behalf of a customer/subscriber) instrument the received program instructions prior to runtime (e.g., at compile time, if the received program instructions have not yet been compiled, or by instrumenting compiled code prior to executing it) or dynamically (e.g., by replacing or inserting code in the instruction stream at runtime), in different embodiments. For example, the service may be configured to modify the received program instructions to replace individual instructions so that they will be executed on different hardware resources, to add checkpointing and/or verification instructions, or both.

Figure 3A:
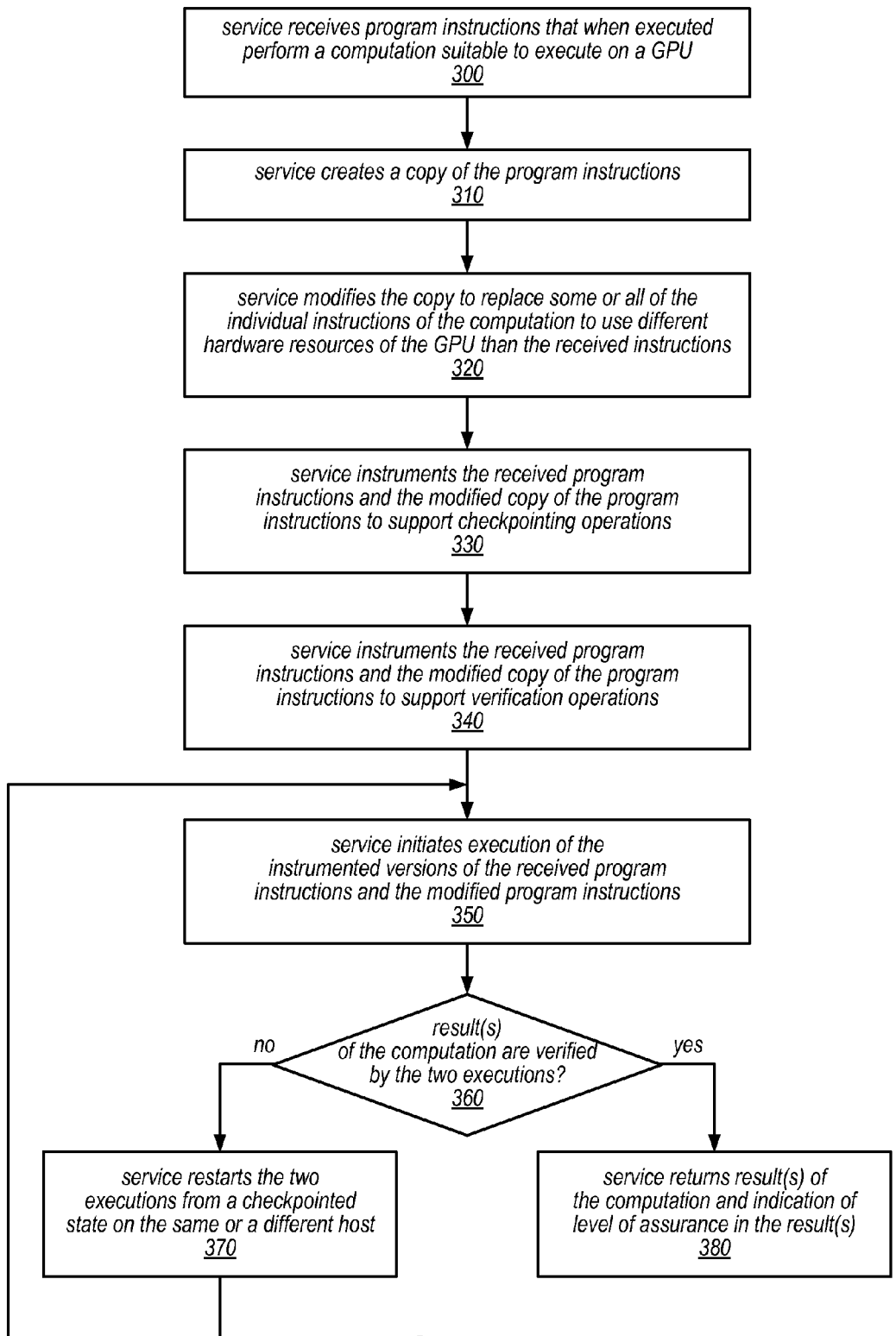
FIG. 3A is a flow diagram illustrating one embodiment of a method for instrumenting code to implement the ECC-like features described herein prior to runtime.

One embodiment of a method for instrumenting code to implement the ECC-like features described herein prior to runtime is illustrated by the flow diagram in FIG. 3A. As illustrated at 300, in this example, the method may include a service receiving program instructions that when executed perform a computation suitable for execution on a GPU. For example, in some embodiments, the program instructions for the computation may be written in such a way as to facilitate their execution on a GPU (e.g., using instructions of the GPU instruction set). The method may also include the service creating a copy of the received program instructions, as in 310, and modifying the copy of the received program instructions to replace some or all of the individual instructions of the computation to use different hardware resources of the GPU than the received program instructions, as in 320. For example, in some embodiments, memory operations may be replicated with memory operations targeting different memory addresses such that the replicated instructions access different DRAM cells than the original instructions, and arithmetic/logical instructions may be replicated such that the replicated instructions use different sets of hardware registers than the original instructions.

As illustrated in this example, the method may include the service (e.g., using an instrumentation process that is configured to receive program instructions and modify them for execution using ECC-like techniques) instrumenting the received program instructions and the modified copy of the program instructions to support checkpointing operations, as in 330, and instrumenting the received program instructions and the modified copy of the program instructions to support verification operations, as in 340. For example, in some embodiments, the service may be configured to instrument the computation code to include instructions (or calls to a library of functions that support ECC-like features) to perform at least some of the operations to implement the checkpointing and/or verification operations described herein at various points in the code. Once the received program instructions and the modified copy of the program instructions have been appropriately instrumented, the method may include the service initiating execution of the instrumented versions of the received program instructions and the modified program instructions, as in 350.

If result(s) of the computation are verified by the two executions (i.e., if intermediate or final results produced by the two executions match), shown as the positive exit from 360, the method may include the service returning the result(s) of the computation and (in some embodiments, or optionally) also returning an indication of the level of assurance in the result(s), as in 380. If, however, the result(s) of the computation are not verified by the two executions (i.e., if intermediate or final results produced by the two executions do not match), shown as the negative exit from 360, the method may include the service restarting the two executions from a checkpointed state on the same host (or GPU thereof) or on a different host (or GPU), as in 370. As in previous examples, this restore operation may include verifying that stored data representing the target checkpointed state has not been tampered with or otherwise corrupted before restoring the two executions (not shown). Note that if the executions are restarted on the same host (or GPU thereof), the method may or may not include modifying the instructions to run on different resources of that host/GPU prior to restarting the executions, in different embodiments.

In various embodiments, instrumentation of the code that performs a computation (or of an application that encloses such code) may be performed by the programmer or by a service provider (or service) at compile time (as in the example above) or dynamically (e.g., in a Java™ runtime environment). In some embodiments, a customer (e.g., a service subscriber) may provide compiled code to the service, and the service may perform dynamic binary instrumentation of the compiled code (which may include loads, stores, arithmetic instructions, etc.) to insert instructions to support the ECC-like feature described herein dynamically at runtime. For example, the service may be configured to receive the compiled code and to duplicate the individual operations inline in the instruction stream while the code is executing, comparing the results as the execution progresses. In other words, in some embodiments, rather than running the same or different streams of instructions in parallel on multiple sets of resources, the service may be configured to cause each individual instruction to be run twice on different hardware resources of the same GPU (e.g., one after the other) and then check the results for that individual instruction to determine whether there are any defects in the hardware. In one example, if the original code includes an instruction for adding two values x and y that are stored in register 1 and register 2, respectively, the service may be configured to insert an additional instruction into the instruction stream at runtime to add the values in register 3 and register 4 (into which values equal to those of x and y were previously stored by an earlier duplicated instruction). Similarly, if the original code includes a load instruction, the service may be configured to insert an additional load instruction into the instruction stream at runtime, such that the same value is loaded from two different memory operations.

Figure 3B:
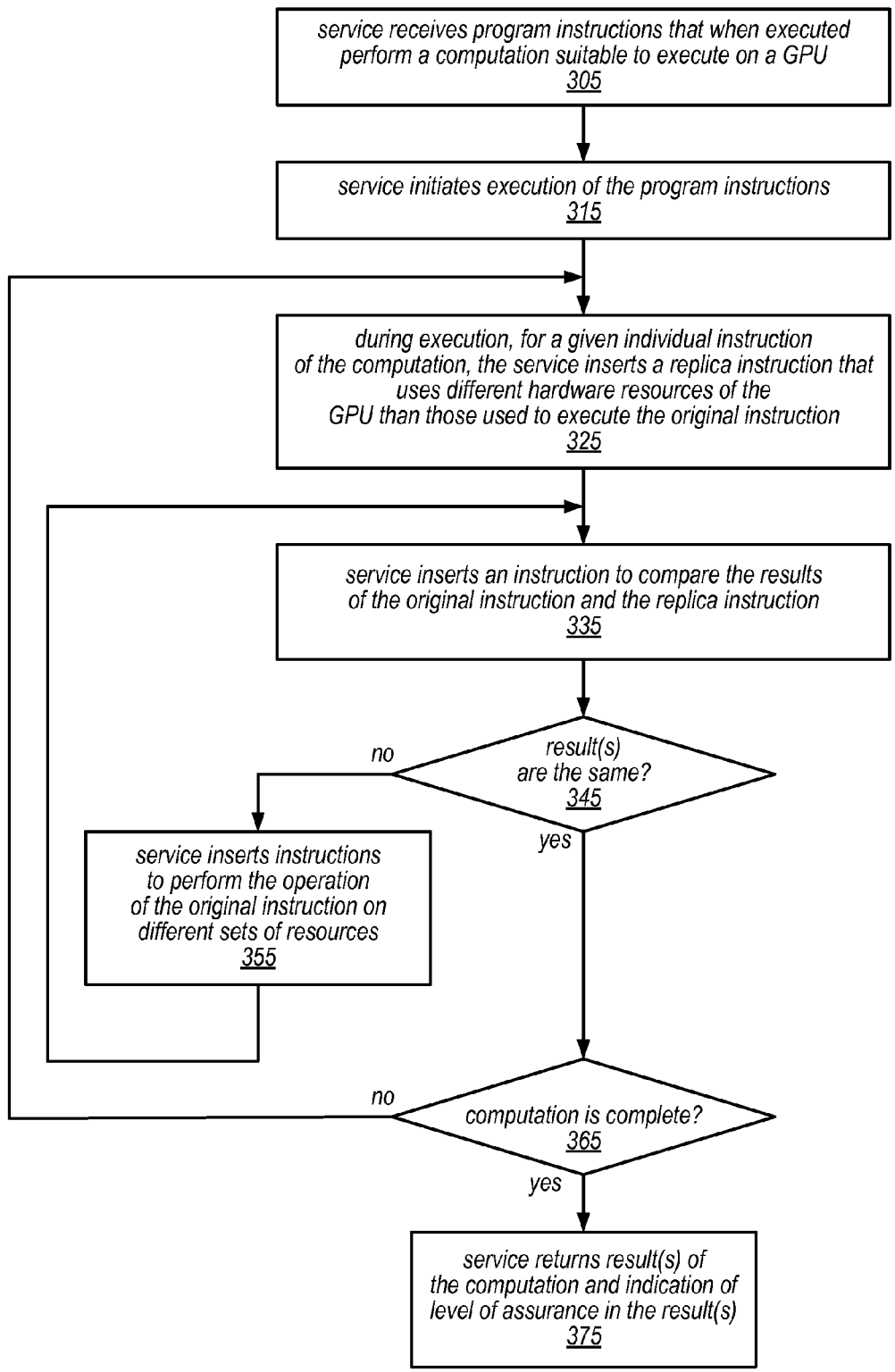
FIG. 3B is a flow diagram illustrating one embodiment of a method for dynamically instrumenting code to implement the ECC-like features described herein at runtime.

One embodiment of a method for dynamically instrumenting code to implement the ECC-like features described herein at runtime is illustrated by the flow diagram in FIG. 3B. As illustrate at 305, in this example, the method may include a service receiving program instructions that when executed perform a computation suitable for execution on a GPU. For example, in some embodiments, the program instructions for the computation may be written in such a way as to facilitate their execution on a GPU (e.g., using instructions of the GPU instruction set). In some embodiments, the program instructions may have already been compiled (e.g., the method may include receiving a binary code representation of the computation or another native-code representation or the computation) or may include code that is to be interpreted at runtime. The method may include the service initiating execution of the program instructions on the GPU, as in 315.

As illustrated in this example, the method may include, during execution of the computation, for a given individual instruction of the computation, the service inserting a replica instruction that uses different hardware resources of the GPU than those used to execute the original instruction, as in 325. For example, the service may insert a modified copy of the given instruction into the instruction stream using dynamic binary patching or another dynamic native-code instrumentation technique such that both the original instruction and the inserted instruction perform the same operation using different resources. The method may also include the service inserting an instruction to compare the results of the original instruction and the replica instruction, as in 335. For example, in some embodiments, the service may insert one or more instructions to perform the comparison operation or to call to a function or sub-function to perform the comparison operation immediately (or shortly) following the execution of the given instruction and the corresponding replica instruction, or at any point at which the results of the original instruction and the replica instruction are expected to be available.

If the result(s) are the same (shown as the positive exit from 345) and if the computation is complete (shown as the positive exit from 365), the method may include the service returning result(s) of the computation and (in some embodiments, or optionally) an indication of the level of assurance in the result(s), as in 375. However, if the result(s) are the same (shown as the positive exit from 345), but the computation is not complete (shown as the negative exit from 365), the method may include continuing to execute the computation, replicating each instruction and verifying the results as the computation progresses. This is illustrated in FIG. 3B as the feedback from the negative exit of 365 to 325.

As illustrated in this example, if the result(s) are not the same (shown as the negative exit from 345), the method may include the service inserting instructions to perform the operation of the original instruction on different sets of resources (as in 355), then comparing the results, and continuing as described above. This is illustrated in FIG. 3B by the path from the negative exit of 345 to 355 and from 355 to 335. Note that, in some embodiments, the service may be configured to repeat the operations illustrated at 335-355 more than once and/or to include a retry limit or timeout condition after which the service would cease to attempt to perform the computation and return an error. However, it may be highly unlikely that, following an attempt to execute an unverified instruction (one whose results did not match in the two executions) on different sets resources, the results of the two executions of the instruction would again fail to match, since it may be extremely rare that multiple sets of resources exhibit the same manufacturing defect.

In some embodiments, the service may (at 355) modify only one of the two instruction streams to execute the unverified instruction on different resources at a time (e.g., within a single iteration of the loop formed at 335-355) in order to identify which of the sets of resources contains a defect or experienced a runtime error. In other embodiments, the service may (at 355) modify both of the instruction streams to execute the unverified instruction on different resources. While not shown in FIG. 3B, in some embodiments in which a service is configured to dynamically instrument the code as described above, the service may also be configured to insert instructions into the instruction stream to perform checkpointing operations at various points during the execution of the computation. In such embodiments, if a comparison operation is unable to verify the execution of an instruction (shown as the negative exit from 335), the method may include the service restarting the two executions from a previously checkpointed state with or without first inserting instructions to perform the operation of the original instruction on different sets of resources (as in 355) and continuing (at 355), as described above.

In some embodiments, checkpointing and/or comparison operations may be performed automatically by the service at pre-defined time intervals (e.g., periodically, such as once every 15 minutes during a very long computation) or at pre-defined points in the code. For example, the service may be configured to perform a checkpointing operation and/or a comparison operation following the execution of each instruction, function, or sub-function; at basic block boundaries (where a basic block is a collection of instructions before a branch-type instruction); at other meaningful code boundaries (e.g., when the computation reaches a particular state). In other embodiments, the service may be configured to perform a checkpointing operation and/or a comparison operation only where the checkpointing or comparison operations are explicitly implemented in the instrumented code. In some embodiments, the service may be configured to perform the checkpointing and/or comparison operations described herein periodically during the execution of test computations and/or to execute test computations periodically in order to detect and/or diagnose defective hardware in the system.

A checkpointing operation may be configured to save the state of the computation and/or the resources on which it is executing such that the computation can be restarted if (at some point) its execution cannot be validated (e.g., if any intermediate or final results of the computation produced by different sets of resources do not match). For example, if executing a computation involving molecular dynamics on a GPU, the checkpointed state may need to include all of the configurational variables of the system (e.g., those representing the Hamiltonian). In general, for any system that has a set of variables that define its save state, the values of these variables may be saved during each checkpointing operation. In other words, the checkpointing operation may be configured to save any and all data that would be needed to resume computation following a failure to validate the computation if it were restarted from that point.

Figure 4:
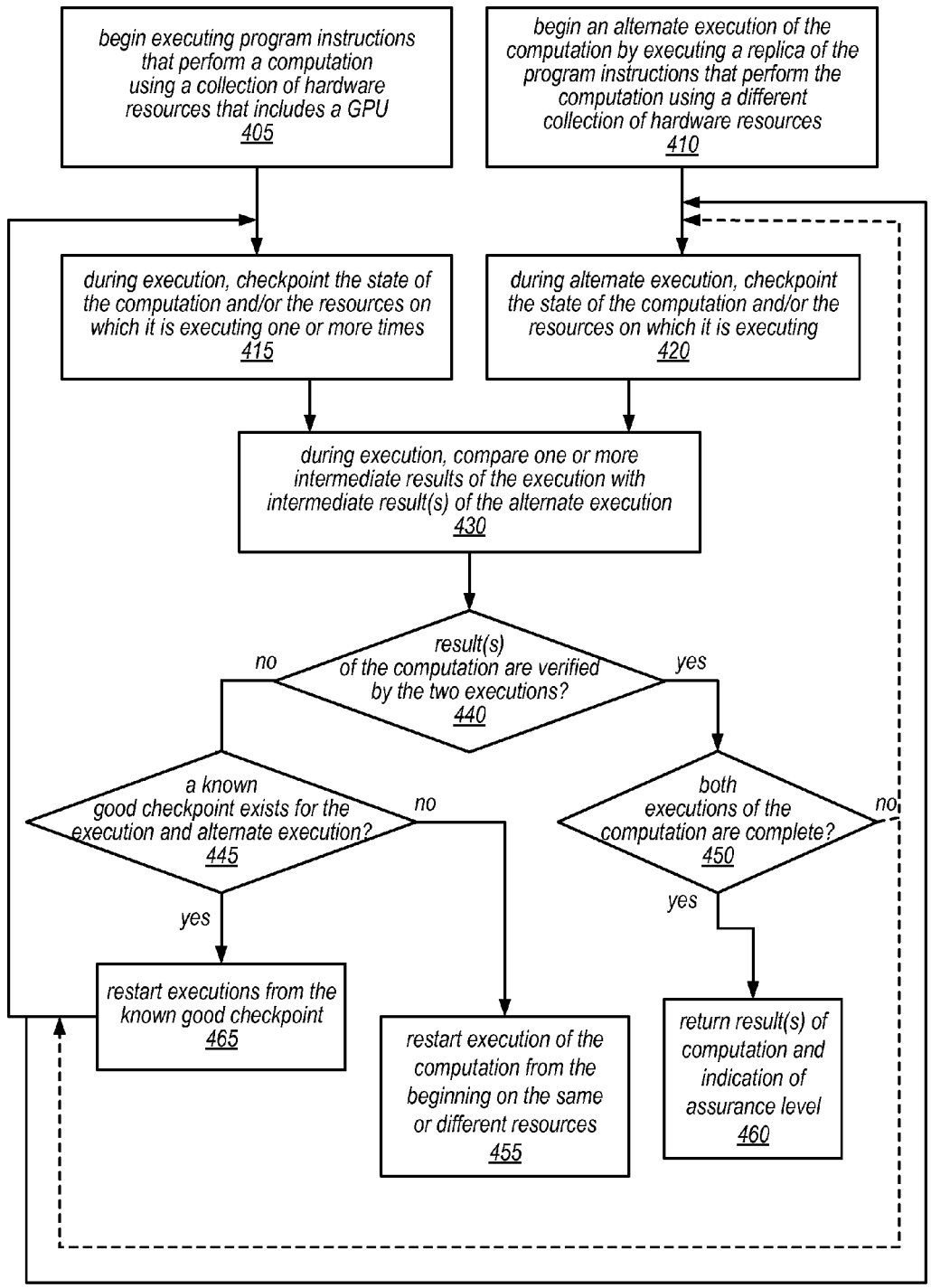
FIG. 4 is a flow diagram illustrating one embodiment of a method for implementing ECC-like features using checkpointing and comparison operations that may be performed by a service provider.

One embodiment of a method for implementing ECC-like features using checkpointing and comparison operations that may be performed by a service provider is illustrated by the flow diagram in FIG. 4. As illustrated at 405, in this example, the method may include beginning the execution of program instructions that perform a computation using a collection of hardware resources that includes a GPU. For example, the program instructions that perform the computation may be instrumented to support the checkpointing and verification operations described herein. The method may also include, at about the same time, beginning an alternate execution of the computation that executes a replica of the program instructions that perform the computation using a different collection of hardware resources, as in 410. In various embodiments, the replica may include the same or different individual program instructions as the original program instructions and the different collection of resources may include a different host, a CPU on the same host rather than a GPU, a different GPU on the same host, other different resources within the same GPU, and/or different memory resources. The program instructions of the replica that perform the computation may also be instrumented to support checkpointing and verification operations described herein.

As illustrated in this example, the method may include, during execution, checkpointing the state of the computation and/or the resources on which it is executing one or more times, as in 415. Similarly, during the alternate execution, the method may include checkpointing the state of the computation and/or the resources on which it is executing, as in 420. At some point during execution, the method may include comparing one or more intermediate results of the execution with the corresponding intermediate result(s) of the alternate execution of the computation, as in 430. For example, the intermediate results may have been produced at the same point in the computation (by the two executions of the computation), regardless of the point within the computation at which the two executions are running when the comparison operation is performed. If the result(s) of the computation are verified by the two executions (e.g., in the results match), shown as the positive exit from 440, and if both executions of the computation are complete, shown as the positive exit from 450, the method may include returning the result(s) of computation and (in some embodiments, or optionally) an indication of assurance level, as in 460.

If the result(s) of the computation are verified by the two executions, but the executions of the computation are not complete (shown as the negative exit from 450) the method may include continuing one or both executions, as needed, to complete the computation by both executions. For example, in some cases, one of the executions may finish before the other (e.g., if one is running on the GPU and the other is running more slowly on a CPU). This is illustrated in FIG. 4 by the dashed lines from the negative exit of 450 to 415 and to 420. Otherwise, if the result(s) of the computation are not verified by the two executions (shown as the negative exit from 440), and if a known good checkpoint exists for the execution and alternate execution (shown as the positive exit from 445), the method may include restarting the executions from the known good checkpoint. This is illustrated in FIG. 4 by the feedback from 465 to 415 and to 420. Note that, as in previous examples, this restore operation may include verifying that stored data representing the known good checkpoint has not been tampered with or otherwise corrupted before restoring the two executions (not shown).

However, if no known good checkpoint exists for the execution and alternate execution (shown as the negative exit from 445), the method may include restarting the two executions of the computation from the beginning on the same resources or on different resources, as in 455 (feedback path not shown). For example, in some embodiments, after failing to verify a single intermediate result, the service may be configured to execute the computation on different resources. In other embodiments, the service may be configured to retry the execution of the computation on the same resources one or more additional times, and may not be configured to schedule the computation for execution on different resources or to modify the program instructions of the execution and the alternate execution so that they use different resources until after multiple such failures. Note, however, that the likelihood of a failure to validate the computation when executing the computation on different resources following a failure to verify a single intermediate result may be extremely small.

Again note that while this example illustrates an embodiment in which a checkpoint is taken prior to performing a compare operation, in other embodiments, a checkpoint may be taken subsequent to performing a corresponding compare operation, and then only if the comparison operation is successful (e.g., if the intermediate results being compared match). For example, in an alternate embodiment, the method illustrated in FIG. 4 may be modified such that the compare operation illustrated at 430 is performed prior to performing the checkpointing operations shown at 415 and 420, and such that the checkpoints are taken only if the intermediate results match (shown as the positive exit from 440) and the computations are not yet complete (shown as the negative exit from 450).

Note that in some embodiments, when executing a computation using two (or more) different sets of hardware resources as part of providing ECC-like features (e.g., when executing computations on a GPU that does not include ECC), the two (or more) executions may not need to be executed entirely in lock-step. For example, in some embodiments, the service may be configured to allow a slack gap between the executions (e.g., a slack gap representing one or more checkpoint intervals). However, the service may implement some amount of synchronization between various checkpointing and error-checking (comparison) operations that are performed by (or on behalf of) the two or more executions. For example, if an operation to compare an intermediate state of or result produced by two different executions at a particular point in the computation fails to verify the intermediate state or result, the service may need to return to the same point in the code in both executions (e.g., to the state that was saved for the same checkpoint), even if one of the executions has gotten ahead of the other (e.g., even if one of the executions has since performed a checkpointing operation to save the state of the computation and/or the resources on which it is executing at a point in the code that is later than that of the most recent checkpointing operation performed by the other).

In some embodiments, a provider of computational services (e.g., one that is configured to perform computations on GPUs on behalf of customers/subscribers) may be configured to provide a framework within which the provider receives requests for computational services and, in response, implements a workflow to perform the requested computations (which may include applying the techniques describes herein for providing ECC-like features when the GPUs do not include sufficient support for error detection and recovery for critical computations). For example, in some embodiments, the service provider may provide an API framework and may support APIs that customers/subscribers can use when writing and/or instrumenting the program instructions that, when executed, will implement the target computation. In response to receiving code that has been written and/or instrumented in accordance with these APIs, the service may be configured to initiate the execution of one or more (possibly parallel) processes to execute the target computation using two or more different sets of hardware resources, may coordinate checkpointing and comparison operations between the process(es), may restart the process(es) (if necessary) following a failure to validate an intermediate state or result of the computation produced by the process(es), and/or may return one or more results of the computation to the customer/subscriber.

In some such embodiments, the APIs supported by the framework may provide customers/subscribers control of various options for executing their computations and/or for applying the techniques described herein for implementing ECC-like features when their computations are executed on service provider resources. For example, through the APIs, a customer/subscriber may be able to specify that a computation should be executed in an ECC-like mode, and/or may be able to specify a desired assurance level, the frequency of checkpointing and/or compare operations, and/or the number of redundant resource instances (e.g., the number of different sets of hardware resources) on which to run the computation. In another example, through the APIs, a customer/subscriber may be able to write or modify the program instructions that implement a computation such that each individual instruction within the program instructions that implement the computation is executed on multiple sets of resources. In some embodiments, through the APIs, a customer/subscriber may be able to write or modify the program instructions that implement a computation such that instructions are inserted into the instruction stream of one or more execution processes to cause the service to automatically perform checkpointing operations for saving the state of the computation and/or the resources on which it is executing (across multiple sets of registers, cores, host machines, or clusters) and/or comparison operations without further user intervention or control.

As described herein, in some embodiments, the service may be configured to automatically instrument the program instructions that implement a computation on behalf of the customer/subscriber that submitted them in order to implement the ECC-like features described herein. In such embodiments, this automated instrumentation may be dependent (at least in part) on any service parameter values that were specified by the customer/subscriber in the code itself, that were received from the customer/subscriber as part of the request, or that were specified as part of an applicable service level agreement. For example, if a particular assurance level is indicated for the computation (e.g., an assurance level that is higher than a standard or default assurance level), the service may be configured to execute the computation on more than two sets of resources or to increase the granularity (and thus, the frequency) at which checkpointing and comparison operations are performed during execution of the computation.

In some embodiments, the service provider system may be configured to determine initial operating parameters and/or tune the operations that implement the ECC-like features (e.g., the granularity) automatically in response to various environmental conditions and/or based on the particular computation or computation type. For example, at higher temperatures, DRAM has a tendency to exhibit a higher number of bit errors. Therefore, under these conditions, or other cases in which the probability of errors is higher, the system may automatically (e.g., programmatically) determine that error checking should be performed and/or that it should be performed at a higher assurance level than would otherwise be the case. In another example, if a particular application includes instructions or code sequences that are particularly sensitive to certain types of errors, the service provider system may be configured to automatically add (or increase) error checking for the portions of the code that can exhibit those types of errors.

Figure 5A:
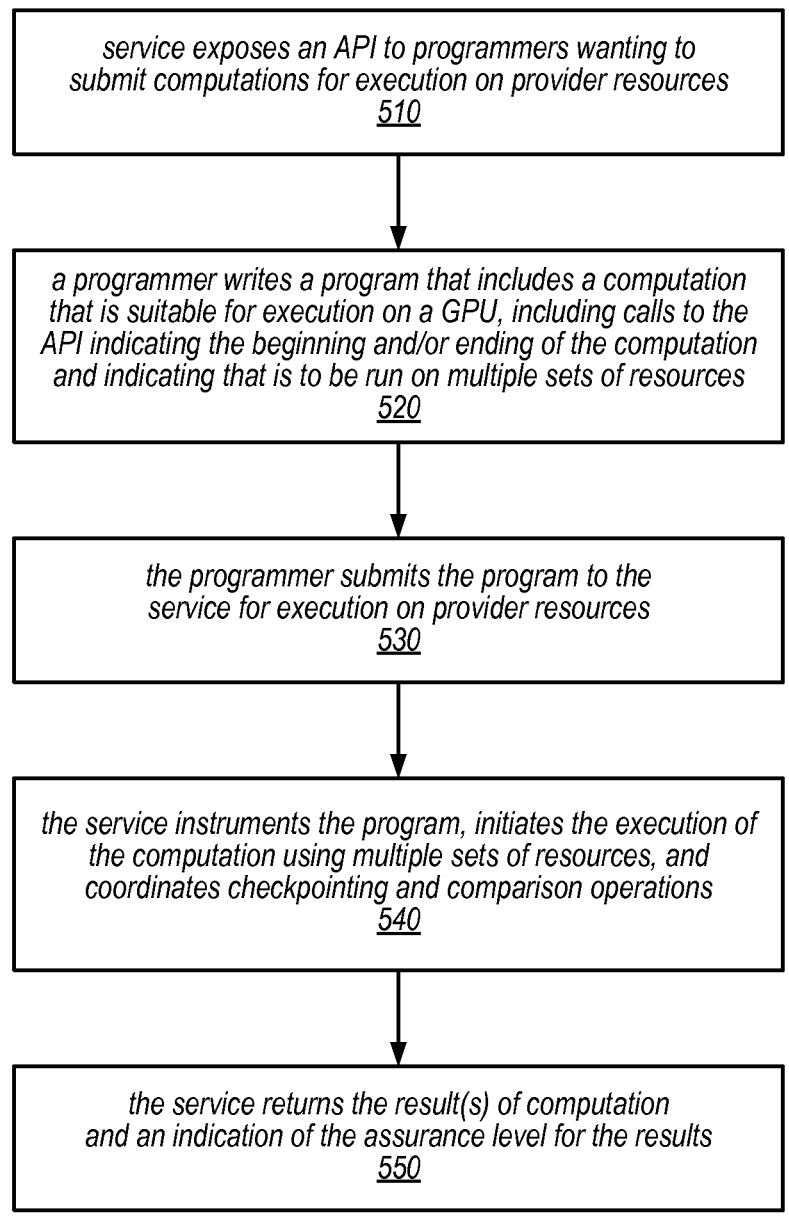
FIG. 5A is a flow diagram illustrating one embodiment of a method for using an API to indicate that a service provider should employ the techniques described herein to provide ECC-like features when executing a computation on behalf of a customer.

One embodiment of a method for using an API to indicate that a service provider should employ the techniques described herein to provide ECC-like features when executing a computation on behalf of a customer is illustrated by the flow diagram in FIG. 5A. As illustrated at 510, in this example, the method may include a service exposing an API to programmers (e.g., customers who are service subscribers) wanting to submit computations for execution on provider resources. The method may include a programmer (e.g., a service subscriber) writing a program that includes a computation that is suitable for execution on a GPU, including calls to the API indicating the beginning and/or ending of the computation and/or indicating that the computation is to be run on multiple sets of resources, as in 520. For example, in some embodiments, the programmer may write the code for the computation in such a way as to facilitate their execution on a GPU (e.g., using instructions of the GPU instruction set). Note that, in this example, the programmer may not instrument the computation code itself for execution with ECC-like features, but may rely on the service provider to instrument the code in response to the identification of the computation and/or the indication that redundant execution is desired.

As illustrated in this example, the method may include the programmer submitting the program to the service for execution on provider resources, as in 530. In response, the method may include the service instrumenting the program (e.g., by inserting program instructions into the instruction stream and/or modifying program instructions), initiating the execution of the computation using multiple sets of resources, and coordinating checkpointing and comparison operations, as in 540. For example, the method may include executing two instruction streams on different sets of resources, checkpointing the state of the computation, execution resources, and/or results of the computation at various points, comparing the results, and (if the results do not match) restarting the execution of the computation at (or prior to) the point of the last validated checkpoint, as needed, using any of the techniques described herein. The method may then include the service returning the result(s) of computation and (in some embodiments, or optionally) an indication of the assurance level for the results, as in 550.

Figure 5B:
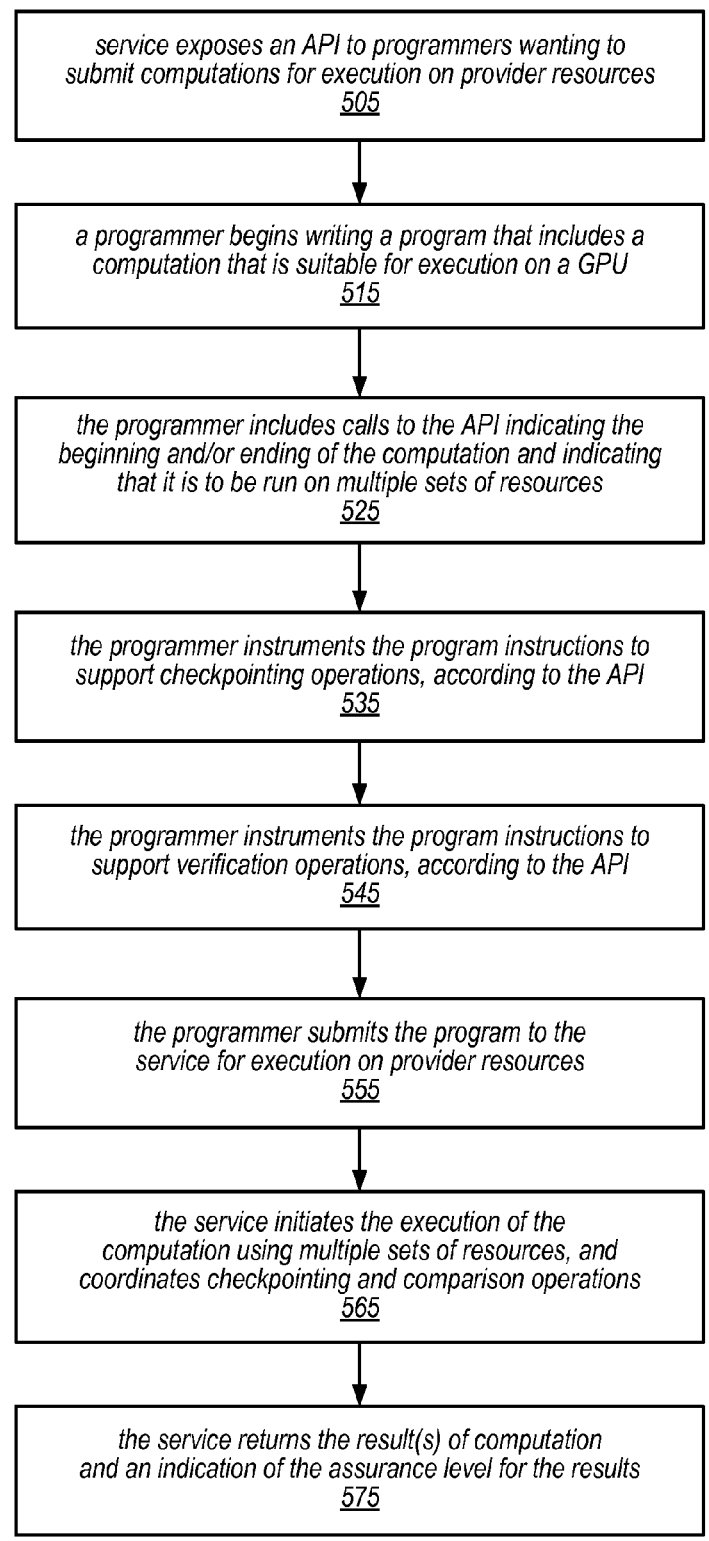
FIG. 5B is a flow diagram illustrating one embodiment of a method for using an API to instrument a program to take advantage of ECC-like features provided by a computational services provider.

One embodiment of a method for using an API to instrument a program to take advantage of ECC-like features provided by a computational services provider is illustrated by the flow diagram in FIG. 5B. As illustrated at 505, in this example, the method may include a service exposing an API to programmers (e.g., customers who are service subscribers) wanting to submit computations for execution on provider resources. The method may include a programmer beginning to write a program that includes a computation that is suitable for execution on a GPU, as in 515. For example, in some embodiments, the programmer may write the code for the computation in such a way as to facilitate their execution on a GPU (e.g., using instructions of the GPU instruction set) and/or may instrument the code to indicate to the service provider that the instructions should be executed on a GPU. Note that, in this example, the programmer may instrument the computation code itself to include instructions (or calls to a library of functions that support ECC-like features) to perform at least some of the operations to implement ECC-like features when executing the computation (e.g., the checkpointing and/or verification operations described herein).

As illustrated in this example, the method may include the programmer including calls to the API indicating the beginning and/or ending of the computation and/or indicating that the computation is to be run on multiple sets of resources, as in 525. The method may also include the programmer instrumenting the received program instructions to support checkpointing operations, according to the API, as in 535, and/or instrumenting the received program instructions to support verification operations, according to the API, as in 545.

Once the program and/or computation thereof have been appropriately instrumented, the method may include the programmer submitting the program to the service for execution on provider resources, as in 555. In response, the method may include the service initiating the execution of the computation using multiple sets of resources, and coordinating checkpointing and comparison operations, as in 565. For example, the method may include executing two instruction streams on different sets of resources, checkpointing the state of the computation, execution resources, and/or results of the computation at various points, comparing the results, and (if the results do not match) restarting the execution of the computation at (or prior to) the point of the last validated checkpoint, as needed, using any of the techniques described herein. The method may then include the service returning the result(s) of computation and (in some embodiments, or optionally) an indication of the assurance level for the results, as in 575. Note that, in some embodiments, even though the program instructions received by the service have been instrumented by the programmer, the service may perform additional instrumentation (e.g., at compile time or using dynamic binary patching or another dynamic native-code instrumentation technique at runtime), as needed to execute the computation while implementing the ECC-like features described herein (not shown).

As described herein, in order to provide ECC-like features when executing a computation on a GPU on behalf of a customer/subscriber, a service provider may instrument the customer/subscriber code, allocate hardware resources, and/or schedule the execution of the computation on two or more sets of hardware resources (e.g., two or more computing resource instances in a cloud computing environment) to initiate or support two or more processes that communicate lightly with each other to coordinate checkpointing and error-checking (comparison) operations.

In some embodiments, service models may be offered in which pricing is differentiated based on the granularity of error detection and recovery capability required by the customer/subscriber when executing a computation in a high performance computing environment. For example, a service provider may build a somewhat generic service framework for providing services (including computational services), and may provide a core set of APIs that are built into how the service works. In some embodiments, additional APIs may be implemented to support specific services (and/or specific options thereof) that are offered by the service provider or that are hosted by the service provider on behalf of other service providers (e.g., checkpointing, error checking and recovery, or both, with or without a specified granularity or assurance level). Subscribers and customers may be able to select the services they wish to obtain and/or various features of those services, some of which may require them to pay a premium or to subscribe to the service at a premium level. In some embodiments, a customer/subscriber may interact with the service provider through an API or a GUI to select services, service options, and/or other features for which the service provider charges more than for a standard service or feature. For example, by selecting an ECC-like mode, a higher level of granularity for error checking, or a larger number of redundant resource instances (using an API call, or a check box, pop-up menu, pull-down menu or other selection mechanism of a GUI) the customer/subscriber may also indicate an agreement to pay a premium price for those computational services (e.g., to add a certain percentage to the standard fee for computational services or to add an additional flat fee). For high-value customer applications (e.g., those that include critical computations or computations that are particularly sensitive to bit errors), executing one or more additional redundant computations, or implementing a finer granularity in checkpointing and/or comparison operations, if requested and paid for by the customer/subscriber, may provide an extra degree of assurance for the results generated (e.g., a higher level of confidence in the results).

In some embodiments in which automated code instrumentation is performed by the service provider, the instrumentation may be transparent to customers/subscribers, who may not need to make any changes to their applications in order to take advantage of the ECC-like features provided by the service. In other words, in some embodiments, no customer involvement may be necessary in order to do the work necessary to implement the ECC-like features described herein when executing a computation on behalf of the customer. Instead, the customer may only need to request that their computation be executed in an ECC-like mode, specify service level parameter values for executing their computation, and/or (in some cases) authorize or indicate a willingness to pay to receive computational services that include executing their computation in an ECC-like mode. For example, a customers may request an "ECC-like" mode when submitting a job (specifying a per-job preference or default/fixed preference for all of their jobs or for multiple related jobs, e.g., a batch of jobs), but may not know, or care, how the service provider system implements the ECC-like features described herein behind the scenes. The service provider system may return error information, in some embodiments, if the computation cannot be run in an ECC-like mode (e.g., if the computation is not deterministic), or for other types of errors.

In other embodiments, the service may be configured to perform all computations that use a GPU in an ECC-like mode by default, and may be configured to apply default parameter values when executing those computations (e.g., a default assurance or granularity level, or a default number of redundant resource instances, such as two resource instances) unless a customer/subscriber indicates that they are willing to pay for a premium level of service (e.g., with higher assurances or finer granularity, or a higher number of redundant resource instance, such as four or six or eight redundant resource instances). In some embodiments, the service provider system may provide a fixed data rate for performing a computation (e.g., one that is specified by or negotiated with the customer and that represents the data rate that they are willing to pay for), and the system may back fill the computation with redundant resources in excess of those that would otherwise be allocated to the computation (according to the applicable assurance level for the computation), up to the amount of maximum amount of resources that would correspond to the fixed data rate, if they are available.

In some embodiments, the overhead incurred when applying the ECC-like features described herein may be minimal (e.g., the impact on performance may be minimal from the perspective of the customer), especially at scale (e.g., in systems running large numbers of large computations for multiple clients over clusters of machines). In some embodiments, any impact on performance for a given computation may only be noticeable if and when the frequency of checkpointing and/or comparison operations is very high. However, even in the case that there is some performance degradation due to the frequency of checkpointing and/or comparison operations, the overall time to complete a given computation may not be significantly affected or may not be a concern for the customer.

In some embodiments, customers/subscribers may be able to make a tradeoff between redundancy (and/or frequent checkpointing and compare operations) and performance, by specifying a particular assurance level or granularity level for the application of the ECC-like features. For example, in some embodiments, there may be a default assurance level for the service provider system when executing computations in an ECC-like mode, but the customer may be able to tune the assurance level (e.g., to dial it down) if performance suffers using the default setting. In other embodiments, there may be a default assurance level for the service provider system when executing computations in an ECC-like mode, but the service may be configured to tune the assurance level (e.g., to dial it down) if performance suffers using the default setting.

Note that executing a computation on a GPU on one additional set of hardware resources (e.g., on two resource instances, total) may in most cases be sufficient to provide assurances of the correctness of a given computation, especially in cloud computing environment in which the operating environment is controlled for the fleet of computing resource instances). For example, in such systems it may be more likely that the failure of an entire core or host machine is detected than that an individual manufacturing defect or other anomaly that could cause a computation error is detected when executing a computation. In some embodiments, a customer (or the service provider system) may dial the redundancy up or down to determine the robustness of an application or of the system with different amount of redundancy, and then may trade off redundancy (and its costs) vs. robustness, as appropriate for their application. The customer (or service provider system) may also tune the frequency of checkpointing and/or error checking operations based on such research. As described herein, a customer may select one or more of: the use of an ECC-like mode, an assurance level, a granularity level, specific options for when and/or how often to perform checkpointing and comparison operations, specific options for the number of redundant instances on which to run the computation, and/or other parameters for the execution of a given computation by a service provider. The service provider system may be configured to divide up the jobs it receives onto different resources transparent to its customers/subscribers using knowledge of the fleet.

In some embodiments, a service provider may build a system for providing high performance computing and computational services in which customers/subscribers have access to schedulers, resource management, checkpointing utilities, and other features. In some such embodiments, the service provider may include the ECC-like features as part of a core set of features that is offered and supported by the service and that is provided to customers to allow them to do more trusted computations. In some embodiments, there may be some flexibility or variation in which, if any, of these features are exposed to particular customers/subscribers and which are implemented by the service provider transparent to customers/subscribers. In some embodiments, the checkpointing operations and/or ECC-like features described herein may be offered as a service to other services or other service providers. For example, one or more of the APIs described herein may be exposed to another service to provide error detection and recovery when executing a computation on a GPU on behalf of the other service.

Figure 6:
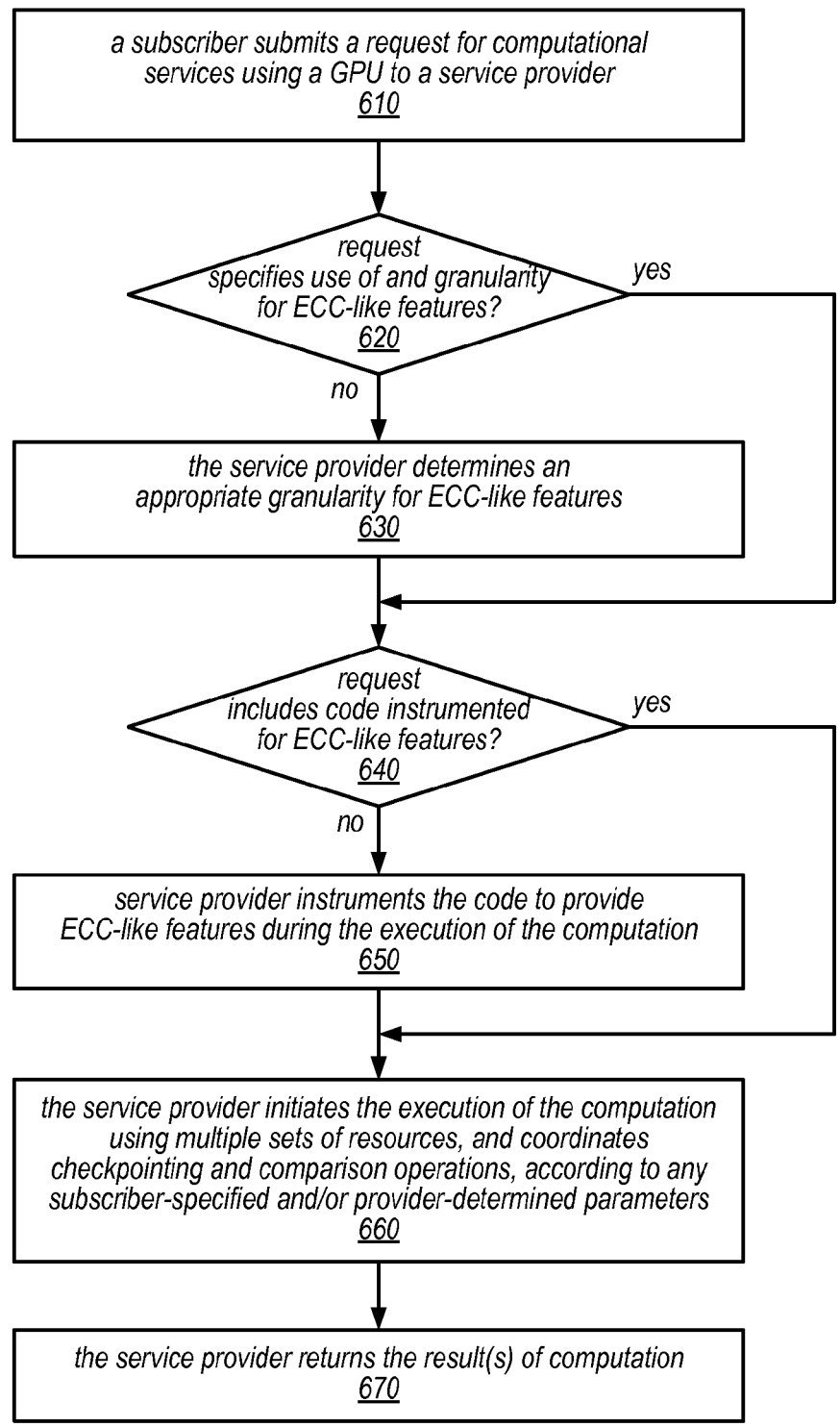
FIG. 6 is a flow diagram illustrating one embodiment of a method for employing the techniques described herein to obtain computational services from a service provider that include the application of ECC-like features.

One embodiment of a method for employing the techniques described herein to obtain computational services from a service provider that include the application of ECC-like features is illustrated by the flow diagram in FIG. 6. As illustrated at 610, in this example, the method may include a service subscriber submitting a request for computational services using a GPU to a service provider. In other words, the subscriber may submit a request for the service provider to execute a computation that is suitable for execution on a GPU on provider resources. For example, the program instructions for the computation may be written in such a way as to facilitate their execution on a GPU (e.g., using instructions of the GPU instruction set). As illustrated in this example, if the request specifies the use of and granularity for ECC-like features provided by the service, as in 620, the specified granularity may be used for the computation. In some embodiments, the subscriber may be able to explicitly specify that the computation should be executed in an ECC-like mode and/or may be able to explicitly specify a desired assurance level, the frequency of checkpointing and/or compare operations (e.g., based on a time interval or by specifying that checkpoints and/or compare operations should be performed for each instruction, basic block, function, or sub-function) and/or the number of redundant resource instances on which to run the computation in an API call to the service or through a graphical user interface (GUI). For example, in some embodiments a GUI through which subscribers interact with the service provider may include selection mechanisms (e.g., check boxes, text input elements, pull-down or pop-up menus, etc.) through which the subscriber may select execution in an ECC-like mode, an assurance level, a number of redundant resource instances on which to run the computation, or any other subscriber-selectable options for executing a computation by a service that provides the ECC-like features described herein. In some embodiments, specifying a desired assurance level or service level may imply values for one or more other parameters. For example, a "premium" service level may imply a particular assurance level and/or may result in the service executing the computation on a particular number of redundant resource instances (e.g., 4, 6, or 8, rather than a default of 2).

As illustrated in this example, if the request does not specify the use of and/or a granularity for any ECC-like features provided by the service, the method may include the service provider determining an appropriate granularity for the ECC-like features, as in 630. For example, in a service provider system in which the GPUs do not implement ECC (or the error checking and correction implemented in the GPU is not sufficient to guarantee results for complex computations and other applications that are particularly sensitive to bit errors or other anomalies), the service may be configured to implement ECC-like features for all computations that use a GPU (or for all computations of at least a given size that use a GPU) by default. In some embodiments, the service may be configured to apply default parameter values (e.g., provider-wide defaults or defaults for a particular subscriber that were specified in negotiated service-level agreement and that are applicable to the request) or to apply parameter values that are determined to be suitable for application to the request based on historical observations of the execution of similar requests (e.g., request from the same subscriber, or request to execute computations of a similar size, type, and/or complexity).

As illustrated in this example, if the request does not include code that has already been instrumented to implement the ECC-like features provided by the service (e.g., using API calls to a library of functions that support ECC-like features or by including code to perform some of the ECC-like operations), shown as the negative exit from 640, the method may include the service provider instrumenting the code to provide the ECC-like features during execution of the computation, as in 650. However, if the request includes code that has already been instrumented to implement ECC-like features (for example, if the code received with the request includes a duplicated instruction stream, API calls to checkpointing and/or comparison functions, or other instrumentation), as in 640, the service provider may or may not need to instrument the computation code itself. The method may also include the service provider initiating the execution of the computation using multiple sets of resources, and coordinating checkpointing and comparison operations, according to any subscriber-specified and/or provider-determined parameters (as in 660), and returning the result(s) of the computation (as in 670).

Note that while many of the examples included herein describe techniques for providing ECC-like features when executing computations on a GPU, in other embodiments, these techniques may be applied to provide ECC-like features when executing computations on other types of multi-core processors that provide parallelism, such as various types of field-programmable gate arrays (FPGAs) or other many-core processors or massively parallel processors. For example, when a computation is submitted to a service on behalf of a client for execution using an FPGA, the service may automatically create a replica of the computation (e.g., one that includes the checkpointing and comparison operations described herein) and may execute the replica of the computation using FGPA resources (cores) that are different than the resources used to execute the received computation (e.g., on the same FPGA or on another FPGA).

Note also that while many of the examples included herein describe techniques for providing ECC-like features when executing single-threaded computations on a GPU, in other embodiments, these techniques may be applied to provide ECC-like features when executing multi-threaded computations on GPUs or on other many-core processors that provide parallelism. In such embodiments, the threads may be grouped into sets of two or more threads, and each such set of threads may be configured for execution on respective sets of resources (e.g., each set of threads may be configured for execution on different pairs of GPUs or other processors). For example, the threads may be instrumented (e.g., at runtime) to include (or call) the checkpointing and comparison operations described herein to perform error detection and/or recovery during execution of the threads on the respective sets of resources.

Figure 7:
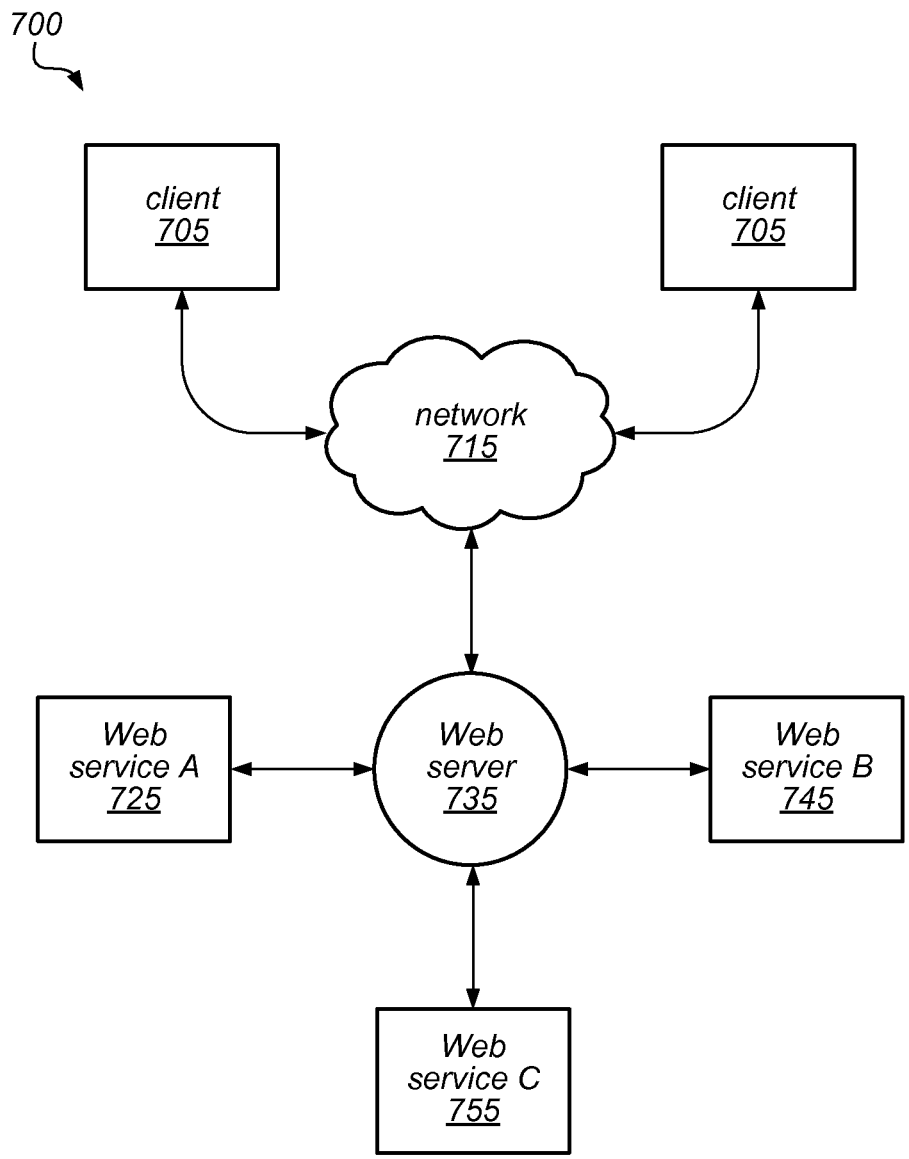
FIG. 7 is a block diagram illustrating one embodiment of a system that provides various Web-based services to clients.

Various techniques described herein for providing ECC-like features when executing computations on a GPU that does not include ECC may be employed in local or remote computing systems, including systems that provide services to users (e.g., subscribers) over the Internet or over other public or private networks, such as virtual private networks and connections to services in a virtual private cloud (VPC) environment. FIG. 7 illustrates a block diagram of a system that provides various Web-based services to clients, according to one embodiment. In this example, system 700 includes one or more clients 705. In this example, the clients 705 may be configured to interact with a Web server 735 via a communication network 715.

As illustrated in this example, the Web server 735 may be configured to process requests from clients 705 for various services, such as Web service A (725), Web service B (745), and Web service C (755), and to return results to the clients 705. Each of the web services may provide clients with one or more of: computational resources, database services, data storage services (e.g., maintaining data in one or more tables on behalf of a client), or any other types of services or shared resources.

Figure 8:
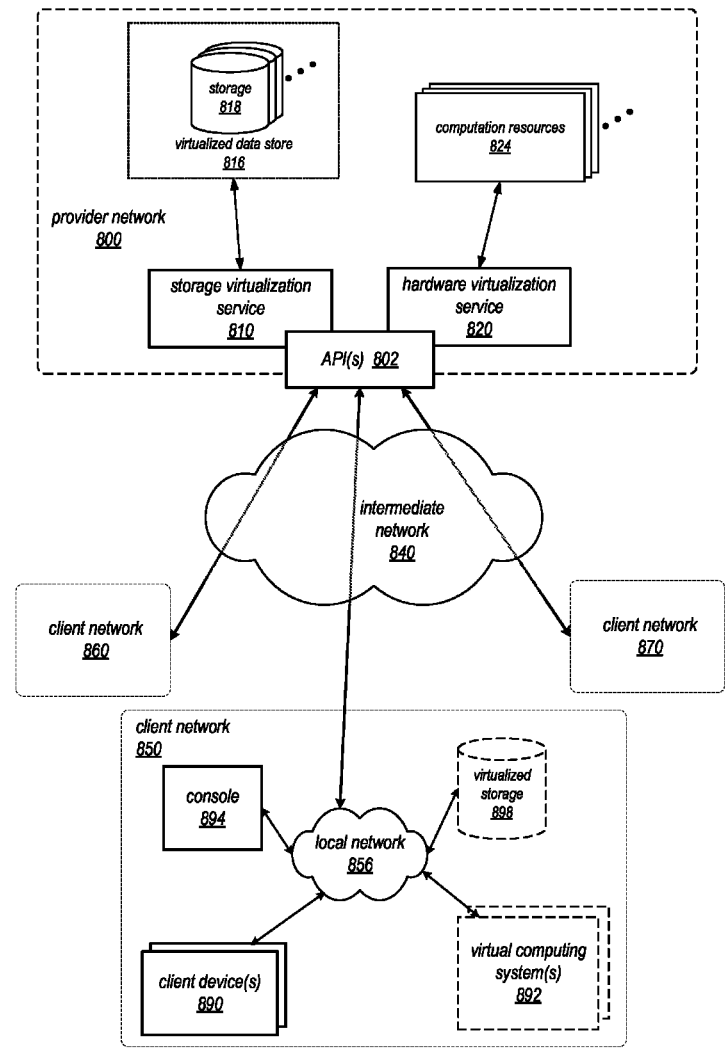
FIG. 8 is a block diagram illustrating an example provider network environment in which the techniques described herein for providing ECC-like features when executing computations on a GPU that does not include ECC, according to at least some embodiments.

FIG. 8 is a block diagram illustrating an example provider network environment in which the techniques described herein for providing ECC-like features when executing computations on a GPU that does not include ECC may be employed, according to at least some embodiments. In this example, the provider network environment 800 provides a storage virtualization service and a hardware virtualization service to clients. In this example, hardware virtualization service 820 provides multiple computation resources 824 (e.g., VMs) to clients. The computation resources 824 may, for example, be rented or leased to clients of the provider network 800 (e.g., to a client that implements client network 850, client network 860, and/or client network 870) in order to implement various applications, which may include observer (e.g., attacking) applications and/or observed (e.g., target) applications. Each computation resource 824 may be provided with one or more private IP addresses. Provider network 800 may be configured to route packets from the private IP addresses of the computation resources 824 to public Internet destinations, and from public Internet sources to the computation resources 824.

Provider network 800 may provide a client network (e.g., client network 850, 860, or 870 coupled to intermediate network 840 via local network 856) the ability to implement virtual computing systems 892 via hardware virtualization service 820 coupled to intermediate network 840 and to provider network 800. Note that in some embodiments, each of client networks 860 and 870 may include elements that are similar to corresponding elements of client network 850 (not shown) and may provide functionality similar to that of client network 850, while in other embodiments, client network 860 and/or 870 may include more, fewer, or different elements than those illustrated in FIG. 8 as being part of client network 850 and/or may provide functionality that is different from that of client network 850. In some embodiments, hardware virtualization service 820 may provide one or more APIs 802, for example a web services interface, via which a client network 850, 860, or 870 may access functionality provided by the hardware virtualization service 820 via a console such as console 894. In at least some embodiments, at the provider network 800, each virtual computing system at a client network (e.g., a virtual computing system 892 at client network 850) may correspond to a computation resource 824 that is leased, rented, or otherwise provided to the client network.

In this example, from an instance of a virtual computing system 892 and/or another client device 890 or console 894 of a client network 850, 860, or 870, a client may access the functionality of storage virtualization service 810, for example via one or more APIs 802, to access data from and store data to a virtual data store 816 provided by the provider network 800. In some embodiments, a virtualized data store gateway (not shown) may be provided at the client network (e.g., at client network 850, 860, or 870) that may locally cache at least some data, for example frequently accessed or critical data, and that may communicate with storage virtualization service 810 via one or more communications channels to upload new or modified data from a local cache so that the primary store of data (virtualized data store 816) is maintained. In at least some embodiments, a user, via a virtual computing system 892 and/or on another client device 890, may mount and access one or more storage volumes 818 of virtual data store 816, each of which appears to the user as local virtualized storage 898.

Figure 9:
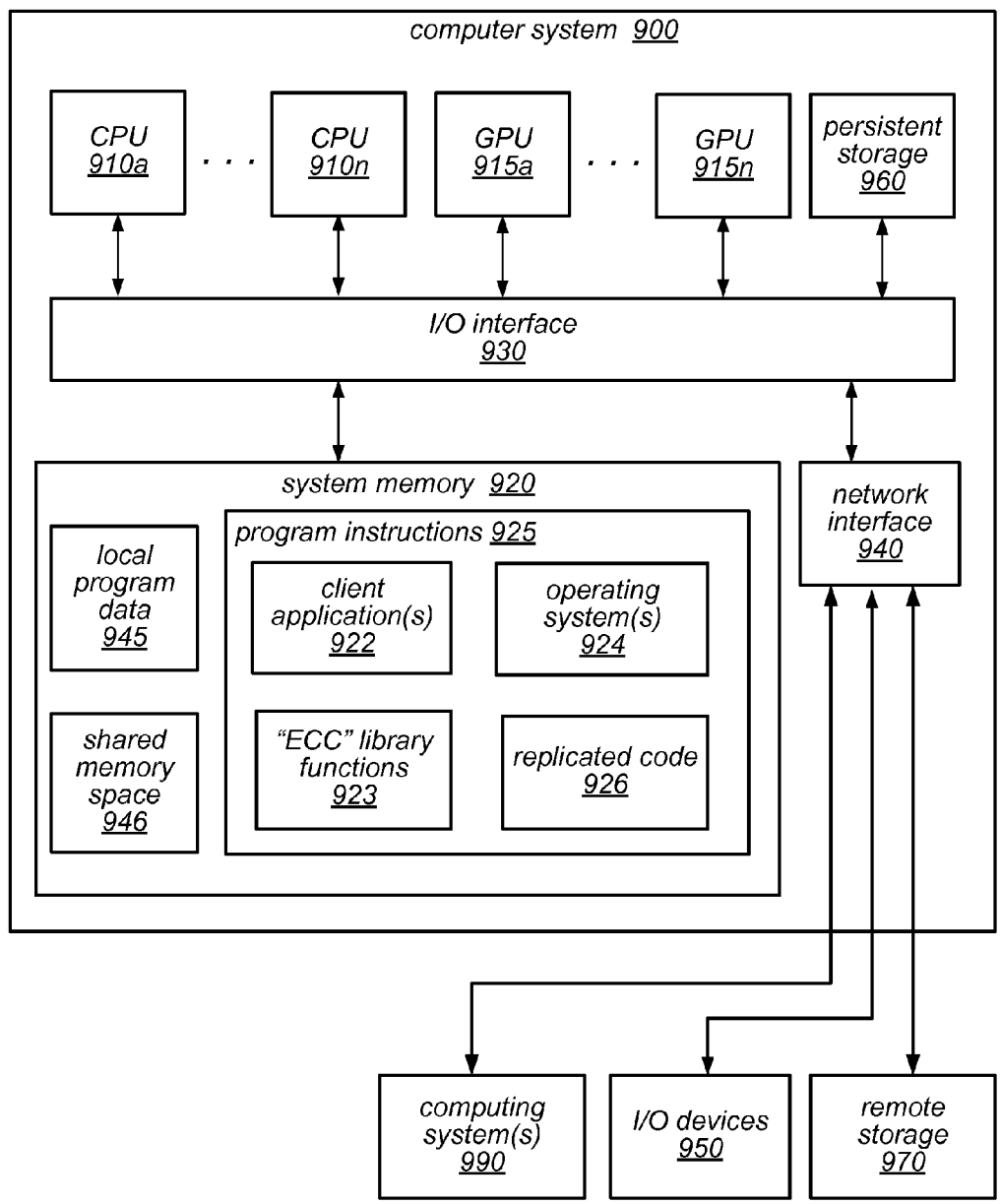
FIG. 9 is a block diagram illustrating a computer system configured to implement the techniques described herein, according to various embodiments.

The methods described herein may in various embodiments be implemented by any combination of hardware and/or software. For example, in one embodiment, the methods may be implemented by a computer system that includes one or more processors (e.g., CPUs and/or GPUs) executing program instructions stored on a computer-readable storage medium coupled to the processor. The program instructions may be configured to implement any or all of the functionality described herein for providing ECC-like features when executing computations on a GPU that does not include ECC. FIG. 9 is a block diagram illustrating a computer system configured to implement the techniques described herein, according to various embodiments. Computer system 900 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Note that computer system 900 may, in various embodiments, be a stand-alone system that provides shared memory for multiple concurrently executing processes and/or applications, a single one of multiple identical or similar computing nodes in a distributed system, or a single computing node in a provider network that provides virtualized storage and/or computing services to clients, as described herein.

Computer system 900 includes one or more processors, including one or more CPUs 910 (any of which may include multiple cores, which may be single or multi-threaded) and/or GPUs 915, all of which are coupled to a system memory 920 via an input/output (I/O) interface 930. Note that while several examples described herein are directed to systems in which the processors (CPUs) implement an x86 instruction set, the techniques described herein are not limited to such embodiments. Computer system 900 further includes a network interface 940 coupled to I/O interface 930. In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA. Similarly, each of GPUs 915 may implement any one of a variety of GPU instruction sets, and in systems that include multiple GPUs 915, the GPUs may commonly, but not necessarily, implement the same instruction set. The computer system 900 also includes one or more network communication devices (e.g., network interface 940) for communicating with other systems and/or components over a communications network (e.g. Internet, LAN, etc.). For example, a client application executing on system 900 may use network interface 940 to communicate with a server application executing on a single server or on a cluster of servers that implement a distributed system. In another example, an instance of a server application executing on computer system 900 may use network interface 940 to communicate with a client application and/or with other instances of the server application that may be implemented on other computer systems.

In the illustrated embodiment, computer system 900 also includes one or more persistent storage devices 960. In various embodiments, persistent storage devices 960 may correspond to disk drives, tape drives, solid state memory, other mass storage devices, or any other persistent storage device. Computer system 900 (or an application, software component, or operating system operating thereon) may store instructions and/or data in persistent storage devices 960, as desired, and may retrieve the stored instruction and/or data as needed.

Computer system 900 includes one or more system memories 920 that are configured to store instructions and data accessible by processors in the system (e.g., processors 910 and/or GPUs 915). In various embodiments, system memories 920 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 920 may contain program instructions 925 that are executable by processor(s) (e.g., CPUs 910 and/or GPUs 915) to implement the methods and techniques described herein for providing ECC-like features when executing computations on a GPU that does not include ECC (e.g., instrumenting a program by inserting program instructions into the instruction stream and/or modifying program instructions, initiating the execution of a computation using multiple sets of resources, and coordinating checkpointing and comparison operations). In various embodiments, program instructions 925 may be encoded in platform native binary, any interpreted language such as Java™ byte-code, or in any other language such as C/C++, Java™, etc., or in any combination thereof. For example, in the illustrated embodiment, program instructions 925 include program instructions executable to implement one or more client application(s) 922 (which may include computations suitable for execution on a GPU 915 that may be validated by a service provider using the techniques described herein), "ECC" library functions 923 (e.g., library functions for coordinating the execution of a computation using multiple resources on the same host or different hosts, for performing and coordinating between checkpointing and comparison operations for a computation executed using multiple sets of resources, and/or for inserting or replacing instructions while instrumenting code, according to an API supported by a service provider), replicated code 926 (which may be produced by a service provider based on received program instruction of a client application 922), and/or operating system(s) 924, which may include or be implemented as a hypervisor or virtual machine monitor, or any of various operating systems, such as UNIX, LINUX, Solaris™, MacOS™, Windows™, etc. Note also that in various embodiments, "ECC" library functions 923 may be implemented as a component of an operating system 924, in some embodiments.

Note that in various embodiments, some or all of system memory 920 (including some or all of program instructions 925, local program data 945, and/or shared memory space 946) may be implemented within shared physical memory pages in a stand-alone computing system or in a system provides virtualized resources to clients, as described herein. Note also that in some embodiments, replicated code 926 may be loaded into a portion of system memory 920 other that the portion of system memory 920 that includes program instructions 925 for execution on one or more alternate (redundant) sets of resources. For example, in some embodiments, replicated code 926 may be loaded into a portion of a system (such as system memory 920) on another host (e.g., on another computer system 900).

Any or all of program instructions 925, including client application(s) 922, "ECC" library functions 923, replicated code 926, and/or operating system(s) 924, may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 900 via I/O interface 930. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 900 as system memory 920 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 940.

In some embodiments, system memory 920 may include storage for local program data 945 and/or shared memory space 946, as described herein. In various embodiments, system memory 920 (e.g., local program data 945 and/or shared memory space 946 within system memory 920) and/or remote storage 970 may store one or more checkpoints taken during one or more executions of a computation, result data for multiple executions of a computation (e.g., captured intermediate or final result values, as well as information about the success or failure of multiple computation executions on different resources), runtime execution parameters (e.g., ECC-like mode parameter values, or granularity or other service level options specified by customer/subscriber as defaults or when submitting a request for computational services).

In one embodiment, I/O interface 930 may be configured to coordinate I/O traffic between processors 910 and/or 915, system memory 920 and any peripheral devices in the system, including through network interface 940 or other peripheral interfaces. In some embodiments, I/O interface 930 may perform any necessary protocol, timing or other data transformations to convert data signals from one component (e.g., system memory 920) into a format suitable for use by another component (e.g., CPU 910 or GPU 915). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments, some or all of the functionality of I/O interface 930, such as an interface to system memory 920, may be incorporated directly into CPU 910 and/or GPU 915.

Network interface 940 may be configured to allow data to be exchanged between computer system 900 and other devices attached to a network, such as other computer systems 990 (which may implement one or more server nodes and/or clients of a distributed system), for example. In addition, network interface 940 may be configured to allow communication between computer system 900 and various I/O devices 950 and/or remote storage 970. Input/output devices 950 may, in some embodiments, include one or more display terminals, keyboards, keypads, touchpads, scanning devices, voice or optical recognition devices, or any other devices suitable for entering or retrieving data by one or more computer systems 900. Multiple input/output devices 950 may be present in computer system 900 or may be distributed on various nodes of a distributed system that includes computer system 900. In some embodiments, similar input/output devices may be separate from computer system 900 and may interact with one or more nodes of a distributed system that includes computer system 900 through a wired or wireless connection, such as over network interface 940. Network interface 940 may commonly support one or more wireless networking protocols (e.g., Wi-Fi/IEEE 802.11, or another wireless networking standard). However, in various embodiments, network interface 940 may support communication via any suitable wired or wireless general data networks, such as other types of Ethernet networks, for example. Additionally, network interface 940 may support communication via telecommunications/telephony networks such as analog voice networks or digital fiber communications networks, via storage area networks such as Fibre Channel SANs, or via any other suitable type of network and/or protocol. In various embodiments, computer system 900 may include more, fewer, or different components than those illustrated in FIG. 9 (e.g., displays, video cards, audio cards, peripheral devices, other network interfaces such as an ATM interface, an Ethernet interface, a Frame Relay interface, etc.)

The various methods as illustrated in the figures and described herein represent example embodiments of methods. The methods may be implemented manually, in software, in hardware, or in a combination thereof. The order of any method may be changed, and various elements may be added, reordered, combined, omitted, modified, etc.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
   a plurality of computing nodes that collectively implement a service, each of the computing nodes comprising at least one processor and a memory; and
   one or more virtualized computing resource instances, each executing on a respective one of the computing nodes, wherein at least one of the virtualized computing resource instances comprises a graphics processing unit (GPU) that does not include hardware support for error detection and recovery;
   wherein the service is configured to:

receive a request for computational services, wherein the request comprises program instructions representing a computation to be executed on the at least one virtualized computing resource instance that includes the GPU that does not include hardware support for error detection and recovery; and in response to receiving the request:
execute the received program instructions on the GPU that does not include hardware support for error detection and recovery;
execute a replica of the received program instructions on one of the virtualized computing resource instances using resources that are different from those used to execute corresponding ones of the received program instructions;
save, during execution of the received program instructions and the replica, state information for the computation and the resources on which it executes; and
restart execution of the received program instructions and the replica from the saved state information in response to determining that a computation error has occurred.

2. The system of claim 1, wherein to determine that a computation error has occurred, the service is configured to determine that an intermediate result of the computation produced by the execution of the received program instructions does not match a corresponding intermediate result of the computation produced by the execution of the replica.

3. The system of claim 2, wherein, prior to executing the received program instructions and the replica, the service is configured to:
instrument the received program instructions and the replica to include additional program instructions that when executed perform comparing the intermediate result of the computation produced by the execution of the received program instructions and the corresponding intermediate result of the computation produced by the execution of the replica; and
instrument the received program instructions and the replica to include additional program instructions that when executed perform saving the state information for the computation and the resources on which it executes.

4. The system of claim 1, wherein the service is further configured to:
generate one or more encrypted hash values, digital signatures, or digital certificates for the saved state information; and
prior to restarting execution of the received program instructions and the replica from the saved state information, determine that the saved state information has not been corrupted based, at least in part, on the encrypted hash values, digital signatures, or digital certificates.

5. A method, comprising:
performing, by a service implemented on one or more computers:
receiving program instructions representing a computation to be executed using a graphics processing unit (GPU); and
in response to said receiving:
executing the received program instructions on a GPU that does not include hardware support for error detection and recovery;
executing a replica of at least a subset of the received program instructions using computing resources that are different from those used to execute corresponding ones of the received program instructions;
comparing, during execution of the received program instructions and the replica, an intermediate result of the computation produced by the execution of the received program instructions and a corresponding intermediate result of the computation produced by the execution of the replica; and
in response to determining that the intermediate result of the computation produced by the execution of the received program instructions and the corresponding intermediate result of the computation produced by the execution of the replica match:
saving state information for the computation and the resources on which it executes; and
continuing the execution of the received program instructions and the replica.

6. The method of claim 5, further comprising:
comparing, during continued execution of the received program instructions and the replica, a second intermediate result of the computation produced by the execution of the received program instructions and a corresponding second intermediate result of the computation produced by the execution of the replica; and
determining that a computation error has occurred, wherein said determining that a computation error has occurred comprises determining that the second intermediate result of the computation produced by the execution of the received program instructions and the corresponding second intermediate result of the computation produced by the execution of the replica do not match.

7. The method of claim 6, further comprising:
in response to determining that a computation error has occurred, performing one or more of:
restarting the execution of the received program instructions and the replica from the saved state information; or
generating an indication of a potentially defective computing resource.

8. The method of claim 5,
wherein said comparing and said saving are performed automatically in response to receiving the program instructions representing the computation to be executed using the GPU.

9. The method of claim 5,
wherein the method further comprises:
receiving a request to execute the computation in an error detection and recovery mode; and
wherein said comparing and said saving are performed in response to receiving the request to execute the computation in an error detection and recovery mode.

10. The method of claim 9, wherein the request further comprises one or more of: an indication of a desired assurance level for execution of the computation, a number of redundant computing resource instances on which to execute the computation, a frequency at which multiple operations to save state information for the computation and the resources on which it executes are to be performed, or a frequency at which multiple operations to compare an intermediate result of the computation produced by the execution of the received program instructions and a corresponding intermediate result of the computation produced by the execution of the replica are to be performed.

11. The method of claim 5, wherein the computing resources that are different from those used to execute corresponding ones of the received program instructions comprise one or more of: a different host machine, a different virtualized computing resource instance, a different GPU, a different GPU core with the same GPU, different registers or memory resources within the same GPU core, or different arithmetic logic units within the same GPU core.

12. The method of claim 5, wherein said executing a replica of at least a subset of the received program instructions using computing resources that are different from those used to execute corresponding ones of the received program instructions comprises executing one or more replicas of the at least a subset of the received program instructions using two or more collections of computing resources that are different from those used to execute corresponding ones of the received program instructions.

13. The method of claim 5, further comprising:
prior to executing the received program instructions and the replica, instrumenting one or more of the received program instructions and the replica to include additional program instructions that when executed perform said saving and said comparing.

14. The method of claim 5, further comprising:
prior to executing the received program instructions and the replica, generating the replica, wherein said generating comprises replacing at least some of the individual instructions in the at least a subset of the received program instructions with instructions that use computing resources that are different from those used to execute corresponding ones of the received program instructions to perform a similar operation.

15. A non-transitory computer-readable storage medium storing program instructions that when executed on one or more computers cause the one or more computers to perform:
receiving program instructions representing a computation to be executed on behalf of a customer or service subscriber; and
in response to said receiving:
initiating execution of the received program instructions on a multi-core processor that provides parallelism and that does not include hardware support for error detection and recovery;
initiating execution of a replica of at least a subset of the received program instructions using computing resources that are different from those used to execute corresponding ones of the received program instructions;
determining that the computation has been performed without error; and
returning to the customer or service subscriber, one or more results of the computation and an indication of level of assurance in the one or more results;
wherein executing the received program instructions and the replica comprises comparing an intermediate result of the computation produced by the execution of the received program instructions and a corresponding intermediate result of the computation produced by the execution of the replica; and
wherein said determining is dependent at least in part on said comparing.

16. The non-transitory computer-readable storage medium of claim 15,
wherein the received program instructions are written in accordance with an application programming interface (API) that is exposed to the customer or service subscriber and that comprises an interface for accessing one or more error detection and recovery features offered by a service provider.

17. The non-transitory computer-readable storage medium of claim 16, wherein executing the received program instructions and the replica comprises executing additional program instructions that were written in accordance with the API and that when executed perform saving state information for the computation and the resources on which it executes.

18. The non-transitory computer-readable storage medium of claim 17,
wherein said saving comprises saving state information for the computation and the resources on which it executes at two or more points in the computation at which a checkpointing operation is indicated in the received program instructions;
wherein said comparing comprises comparing intermediate results of the computation at two or more points in the computation at which an error checking operation is indicated in the received program instructions; and
wherein the two or more points in the computation at which a checkpointing operation is indicated or the two or more points in the computation at which an error checking operation is indicated represent instruction boundaries, basic block boundaries, function boundaries, or sub-function boundaries within the computation.

19. The non-transitory computer-readable storage medium of claim 17,
wherein said saving comprises saving state information for the computation and the resources on which it executes at two or more points in the computation at which a checkpointing operation is indicated in the received program instructions;
wherein said comparing comprises comparing intermediate results of the computation at two or more points in the computation at which an error checking operation is indicated in the received program instructions; and
wherein the two or more points in the computation at which a checkpointing operation is indicated or the two or more points in the computation at which an error checking operation is indicated are determined automatically dependent, at least in part, on one or more of: an assurance level specified for the received program instructions, a checkpointing or error checking frequency specified for the received program instructions, a computation type, the size of the computation, a sensitivity of the computation to manufacturing defects, or an environmental factor in the physical environment in which the computation is executing.

20. The non-transitory computer-readable storage medium of claim 15, wherein the program instructions when executed on one or more computers cause the one or more computers to perform:
receiving program instructions representing a second computation to be executed on behalf of a customer or service subscriber; and
in response to receiving the program instructions representing the second computation:
initiating execution of the received program instructions representing the second computation on a collection of computing resources comprising a multi-core processor that does not include hardware support for error detection and recovery;

initiating execution of a replica of at least a subset of the received program instructions representing the second computation using computing resources that are different from those used to execute corresponding ones of the received program instructions representing the second computation;

determining that a computation error has occurred; and in response to said determining, reinitiating execution of the received program instructions representing the second computation and the replica of the least a subset of the received program instructions representing the second computation from previously saved state information;

wherein executing the received program instructions representing the second computation and the replica of the least a subset of the received program instructions representing the second computation comprises comparing an intermediate result of the computation produced by the execution of the received program instructions representing the second computation and a corresponding intermediate result of the computation produced by the execution of the replica of the least a subset of the received program instructions representing the second computation; and wherein said determining is dependent at least in part on said comparing.

* * * * *